United States Patent
Bita et al.

(10) Patent No.: US 8,810,528 B2
(45) Date of Patent: Aug. 19, 2014

(54) ILLUMINATION DEVICE WITH METALIZED LIGHT-TURNING FEATURES

(75) Inventors: Ion Bita, San Jose, CA (US); Stephen P. Dhanens, Del Mar, CA (US); Evgeni P. Gousev, Saratoga, CA (US); Kollengode S. Narayanan, Cupertino, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 246 days.

(21) Appl. No.: 12/979,196

(22) Filed: Dec. 27, 2010

(65) Prior Publication Data

US 2011/0157093 A1    Jun. 30, 2011

Related U.S. Application Data

(60) Provisional application No. 61/290,868, filed on Dec. 29, 2009.

(51) Int. Cl.
*G06F 3/041*    (2006.01)

(52) U.S. Cl.
USPC .............................. 345/173; 349/63; 362/615

(58) Field of Classification Search
USPC ............... 345/173–179, 156, 102; 178/18.06; 359/290; 349/61–71; 362/615–629
See application file for complete search history.

(56) References Cited

U.S. PATENT DOCUMENTS

| | | | |
|---|---|---|---|
| 5,221,982 A | 6/1993 | Faris | |
| 5,648,642 A * | 7/1997 | Miller et al. | 178/18.06 |
| 6,040,937 A | 3/2000 | Miles | |
| 6,099,134 A | 8/2000 | Taniguchi et al. | |
| 6,456,279 B1 | 9/2002 | Kubo et al. | |
| 6,603,520 B2 | 8/2003 | Umemoto | |
| 6,631,998 B2 | 10/2003 | Egawa et al. | |
| 6,652,109 B2 | 11/2003 | Nakamura | |
| 6,674,562 B1 | 1/2004 | Miles | |
| 6,891,530 B2 | 5/2005 | Umemoto et al. | |
| 7,123,216 B1 | 10/2006 | Miles | |
| 7,327,510 B2 | 2/2008 | Cummings et al. | |
| 7,553,749 B2 | 6/2009 | Hu | |
| 7,733,439 B2 | 6/2010 | Sampsell et al. | |
| 7,750,886 B2 | 7/2010 | Sampsell | |
| 7,843,061 B2 | 11/2010 | Poli et al. | |

(Continued)

FOREIGN PATENT DOCUMENTS

| | | |
|---|---|---|
| EP | 0675318 A1 | 10/1995 |
| JP | H10326515 A | 12/1998 |

(Continued)

OTHER PUBLICATIONS

Written Opinion in PCT/US2010/061895, dated Dec. 1, 2011.

(Continued)

*Primary Examiner* — Dmitriy Bolotin
(74) *Attorney, Agent, or Firm* — Knobbe, Martens, Olson & Bear LLP

(57) ABSTRACT

This disclosure provides systems, methods and apparatus for a front illumination device with metalized light-turning features. In one aspect, an illumination device with integrated touch sensor capability includes a light guide having a metalized light-turning feature and an electrode system for sensing changes to the capacitance between electrodes in the electrode system induced by the proximity of an electrically conductive body, such as a human finger. The metalized light-turning features may be electrically connected to and/or part of the electrode system.

39 Claims, 15 Drawing Sheets

(56) References Cited

U.S. PATENT DOCUMENTS

| | | |
|---|---|---|
| 7,986,451 B2 * | 7/2011 | Gally et al. .............. 359/291 |
| 8,346,048 B2 | 1/2013 | Bita et al. |
| 2002/0154256 A1 | 10/2002 | Goto |
| 2003/0001985 A1 | 1/2003 | Doe |
| 2003/0011720 A1 | 1/2003 | Kawashima et al. |
| 2004/0188599 A1 | 9/2004 | Viktorovitch et al. |
| 2005/0162606 A1 * | 7/2005 | Doane et al. .............. 349/158 |
| 2006/0066586 A1 * | 3/2006 | Gally et al. .............. 345/173 |
| 2006/0066935 A1 | 3/2006 | Cummings |
| 2006/0097991 A1 | 5/2006 | Hotelling et al. |
| 2007/0074913 A1 * | 4/2007 | Geaghan et al. .......... 178/18.06 |
| 2007/0147087 A1 | 6/2007 | Parker |
| 2007/0210163 A1 | 9/2007 | Han |
| 2007/0279727 A1 | 12/2007 | Gandhi |
| 2008/0084600 A1 | 4/2008 | Bita et al. |
| 2008/0090025 A1 | 4/2008 | Freking |
| 2008/0232135 A1 | 9/2008 | Kinder |
| 2009/0050454 A1 | 2/2009 | Matsukawa et al. |
| 2009/0090611 A1 | 4/2009 | Zeijlon et al. |
| 2009/0151771 A1 * | 6/2009 | Kothari et al. .............. 136/246 |
| 2009/0194344 A1 * | 8/2009 | Harley et al. .............. 178/18.06 |
| 2009/0315854 A1 | 12/2009 | Matsuo |
| 2009/0315858 A1 | 12/2009 | Sato |
| 2010/0045630 A1 * | 2/2010 | Gu et al. .............. 345/174 |
| 2010/0079384 A1 * | 4/2010 | Grivna .............. 345/173 |
| 2010/0135038 A1 | 6/2010 | Handschy et al. |
| 2010/0238529 A1 | 9/2010 | Sampsell et al. |
| 2010/0302135 A1 | 12/2010 | Larson et al. |
| 2010/0302218 A1 | 12/2010 | Bita et al. |
| 2010/0302803 A1 | 12/2010 | Bita et al. |
| 2011/0007020 A1 * | 1/2011 | Hong et al. .............. 345/174 |
| 2011/0115747 A1 | 5/2011 | Powell et al. |
| 2011/0157058 A1 | 6/2011 | Bita |
| 2013/0127784 A1 | 5/2013 | Martin |

FOREIGN PATENT DOCUMENTS

| | | |
|---|---|---|
| JP | 11 211999 | 8/1999 |
| JP | 2001051256 A | 2/2001 |
| JP | 2003066237 A | 3/2003 |
| JP | 2003 186008 | 7/2003 |
| JP | 2003242814 A | 8/2003 |
| JP | 2006-120571 | 5/2006 |
| JP | 03150179 U | 4/2009 |
| JP | 2009070191 A | 4/2009 |
| WO | WO 99/67678 A2 | 12/1999 |
| WO | WO 00/50807 | 8/2000 |
| WO | WO 2008/045207 | 4/2008 |
| WO | WO-2009154957 | 12/2009 |
| WO | WO 2011/082086 | 7/2011 |
| WO | WO 2011/082088 | 7/2011 |

OTHER PUBLICATIONS

International Preliminary Report on Patentability in PCT/US2010/061895, dated Apr. 4, 2012.
Written Opinion in PCT/US2010/061921, dated Dec. 1, 2011.
International Preliminary Report on Patentability in PCT/US2010/061921, dated Apr. 2, 2012.
International Search Report and Written Opinion in PCT/US2010/061921, dated Apr. 15, 2011.
International Search Report and Written Opinion in PCT/US2010/061895, dated Apr. 12, 2011.
Westheimer, Gerald, "The eye as an optical instrument," in Handbook of Perception and Human Performance: Sensory Processes and Perception, vol. 1, ed. Boff et al. (Wiley-Interscience, 1986) Ch. 4, pp. 13-14.
Office Action in U.S. Appl. No. 12/979,148, dated Oct. 3, 2012.
Amendment in U.S. Appl. No. 12/979,148, dated Jan. 3, 2013.
Office Action in U.S. Appl. No. 12/979,148, dated Jan. 16, 2013.

* cited by examiner

Common Voltages

| Segment Voltages | $VC_{ADD\_H}$ | $VC_{HOLD\_H}$ | $VC_{REL}$ | $VC_{HOLD\_L}$ | $VC_{ADD\_L}$ |
|---|---|---|---|---|---|
| $VS_H$ | Stable | Stable | Relax | Stable | Actuate |
| $VS_L$ | Actuate | Stable | Relax | Stable | Stable |

ILLUMINATION DEVICE WITH METALIZED LIGHT-TURNING FEATURES

CROSS-REFERENCE TO RELATED APPLICATIONS

This disclosure claims priority to U.S. Provisional Patent Application No. 61/290,868, filed Dec. 29, 2009, entitled "FRONT ILLUMINATION DEVICE WITH TOUCH SENSOR FUNCTIONALITY." The disclosure of the prior application is considered part of, and is incorporated by reference in, this disclosure.

TECHNICAL FIELD

This disclosure relates generally to electromechanical systems and display devices for actively displaying images. More specifically, some implementations relate to an illumination device for display devices. Some implementations relate to touch-screen sensor devices and electrodes. In some implementations, an illumination device and a touch-screen sensor device are integrated into a single illumination device with integrated touch sensor capability.

DESCRIPTION OF THE RELATED TECHNOLOGY

Electromechanical systems include devices having electrical and mechanical elements, actuators, transducers, sensors, optical components (e.g., mirrors) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a metallic membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

Reflected ambient light is used to form images in some display devices, such as those using pixels formed by interferometric modulators. The perceived brightness of these displays depends upon the amount of light that is reflected towards a viewer. In low ambient light conditions, light from an artificial light source is used to illuminate the reflective pixels, which then reflect the light towards a viewer to generate an image. To meet market demands and design criteria, new illumination devices are continually being developed to meet the needs of display devices, including reflective and transmissive displays.

SUMMARY

The systems, methods and devices of the disclosure each have several innovative aspects, no single one of which is solely responsible for the desirable attributes disclosed herein.

One innovative aspect of the subject matter described in this disclosure can be implemented in an illumination device with integrated touch sensor capability that includes a light guide having a conductor formed on a light-turning feature. The illumination device also includes a touch-sensing electrode system capable of sensing a change to a capacitance of the conductor induced by the proximity of an electrically conductive body, such as a human finger. In certain implementations, the light guide is disposed over a reflective display. In certain implementations, the light guide may include a light-turning layer formed on a substrate where the light-turning feature is formed in the light-turning layer. In certain implementations, the touch-sensing electrode system may include a first electrode and a second electrode formed on a single surface. The first electrode extends in one direction and a second electrode extends in another, non-parallel direction, where the first electrode has a gap with two sides formed to prevent the intersection of the first and the second electrodes and the gap breaks the first electrode into a first side and a second side. In certain implementations, the first electrode is electrically connected to the second side of the first electrode across the gap through a conductive bridge and vias formed on both sides of the gap. In certain implementations, the conductive bridge is formed on a level below the surface of the first and second electrodes.

Another innovative aspect of the subject matter described in this disclosure can be implemented in an illumination device with integrated touch sensor capability that includes a guiding means for guiding light having a conducting means for conducting electricity formed on a turning means for turning light and a sensing means for sensing a change to a capacitance of the conducting means induced by the proximity of an electrically conductive body. In certain implementations, the guiding means comprises a light guide, the conducting means comprises a conductor, the turning means comprises a light-turning feature, or the sensing means comprises a touch-sensing electrode system.

Another innovative aspect of the subject matter described in this disclosure can be implemented in a method of manufacturing an illumination device with integrated touch-sensing capability that includes disposing a conductor on surfaces of a light-turning feature in a light guide and electrically connecting the conductor to an electrode system capable of sensing a change to a capacitance of the conductor induced by the proximity of a conducting body. Certain implementations may include taper etching the light-turning feature on the light guide to form a facet and depositing a reflective conductor on the facet. Certain implementations may include depositing an index-matched turning layer on a substrate and taper etching the light-turning feature in the turning layer. Certain implementations may include patterning a first electrode extending in one direction and a second electrode extending in another, non-parallel direction on the turning layer and patterning a gap with two sides in the first electrode formed to prevent the intersection of the first and the second electrodes, where the gap breaks the first electrode into a first side and a second side. In certain implementations the light-turning feature may be etched for electrically connecting to one of the first and second sides of the first electrode. In certain implementations, a conductor may be formed on the light-turning feature and a conductive bridge may be deposited in a layer below the turning layer thereby electrically bridging the first and the second side of the first electrode through the conductor formed on the light-turning feature and the conductive bridge.

Another innovative aspect of the subject matter described in this disclosure can be implemented in an illumination device that includes a light guide having a conductor formed on a light-turning facet, where the conductor that is formed on the light-turning facet is electrically connected to an electronic system. In certain implementations, the electronic system is a touch sensor system.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
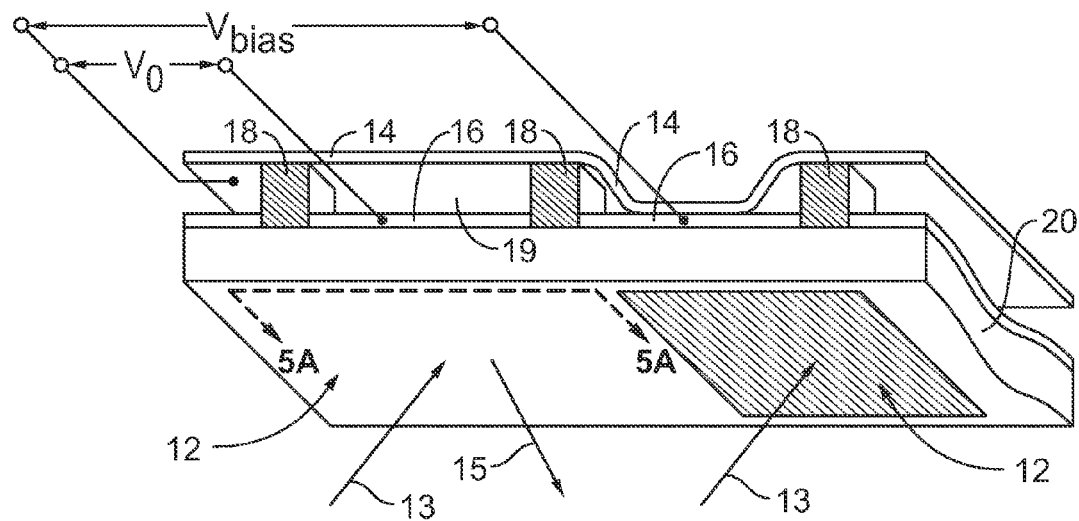
FIG. 1 shows an example of an isometric view depicting two adjacent pixels in a series of pixels of an interferometric modulator (IMOD) display device.

The following detailed description is directed to certain implementations for the purposes of describing the innovative aspects. However, the teachings herein can be applied in a multitude of different ways. The described implementations may be implemented in any device that is configured to display an image, whether in motion (e.g., video) or stationary (e.g., still image), and whether textual, graphical or pictorial. More particularly, it is contemplated that the implementations may be implemented in or associated with a variety of electronic devices such as, but not limited to, mobile telephones, multimedia Internet enabled cellular telephones, mobile television receivers, wireless devices, smartphones, bluetooth devices, personal data assistants (PDAs), wireless electronic mail receivers, hand-held or portable computers, netbooks, notebooks, smartbooks, printers, copiers, scanners, facsimile devices, GPS receivers/navigators, cameras, MP3 players, camcorders, game consoles, wrist watches, clocks, calculators, television monitors, flat panel displays, electronic reading devices (e.g., e-readers), computer monitors, auto displays (e.g., odometer display, etc.), cockpit controls and/or displays, camera view displays (e.g., display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, packaging (e.g., MEMS and non-MEMS), aesthetic structures (e.g., display of images on a piece of jewelry) and a variety of electromechanical systems devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes, electronic test equipment. Thus, the teachings are not intended to be limited to the implementations depicted solely in the Figures, but instead have wide applicability as will be readily apparent to one having ordinary skill in the art.

Various implementations disclosed herein relate to an illumination device having a light guide with integrated conductive features in the light-turning features of the light guide. The conductive features are electrically connected to an electronic system. In some implementations, the electronic system is part of a touch sensing system that allows the illumination devices to provide touch sensor capability. The illumination device integrated with touch sensor capability includes a light guide having one or more metalized light-turning features. The device also includes an electrode system for sensing changes to the capacitance between electrodes in the electrode system induced by the proximity of an electrically conductive body, such as a human finger. In some implementations, the conductors forming the metalized light-turning features are in electrical communication with the touch-sensing electrode system.

Particular implementations of the subject matter described in this disclosure can be implemented to realize one or more of the following potential advantages. For example, some implementations of the illumination device described herein include metalized light-turning features that may improve the functionality of the light-turning features by reflecting light impinging on the light-turning features from a wider range of angles than may occur without the metallization. At the same time, the illumination device may also have electrodes or conductors that are integrated with a touch-sensing electrode or electronic system that uses electrodes, conductive traces, or other electric structures to detect the proximity of an electrically conductive body. In some implementations, the electric structures used to help detect the conductive body may include the metalized light-turning features. In other implementations, the metalized light-turning features may not be electrically connected to any electric circuitry. In either case, the electric structures and the metalized light-turning features may be manufactured using the same deposition and lithographic process. In this way, an integrated illumination device with touch-sensing capability may be manufactured in fewer steps than it would take to manufacture the electric structures and the metalized light-turning features separately. In addition, integrating electric structures with the light-turning features allows the formation of thinner devices than would be available if different layers of material were used for light-turning features and the electric structures.

One example of a suitable MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the optical resonant cavity, i.e., by changing the position of the reflector.

FIG. 1 shows an example of an isometric view depicting two adjacent pixels in a series of pixels of an interferometric modulator (IMOD) display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when unactuated, reflecting light outside of the visible range (e.g., infrared light). In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent interferometric modulators 12. In the IMOD 12 on the left (as illustrated), a movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows 13 indicating light incident upon the pixels 12, and light 15 reflecting from the pixel 12 on the left. Although not illustrated in detail, it will be understood by one having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixel 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, e.g., chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and conductor, while different, more conductive layers or portions (e.g., of the optical stack 16 or of other structures of the IMOD) can serve to bus signals between IMOD pixels. The optical stack 16 also can include one or more insulating or dielectric layers covering one or more conductive layers or a conductive/absorptive layer.

In some implementations, the layer(s) of the optical stack 16 can be patterned into parallel strips, and may form row electrodes in a display device as described further below. As will be understood by one having skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be on the order of 1-1000 um, while the gap 19 may be on the order of <10,000 Angstroms (Å).

In some implementations, each pixel of the IMOD, whether in the actuated or relaxed state, is essentially a capacitor formed by the fixed and moving reflective layers. When no voltage is applied, the movable reflective layer 14a remains in a mechanically relaxed state, as illustrated by the pixel 12 on the left in FIG. 1, with the gap 19 between the movable reflective layer 14 and optical stack 16. However, when a potential difference, e.g., voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
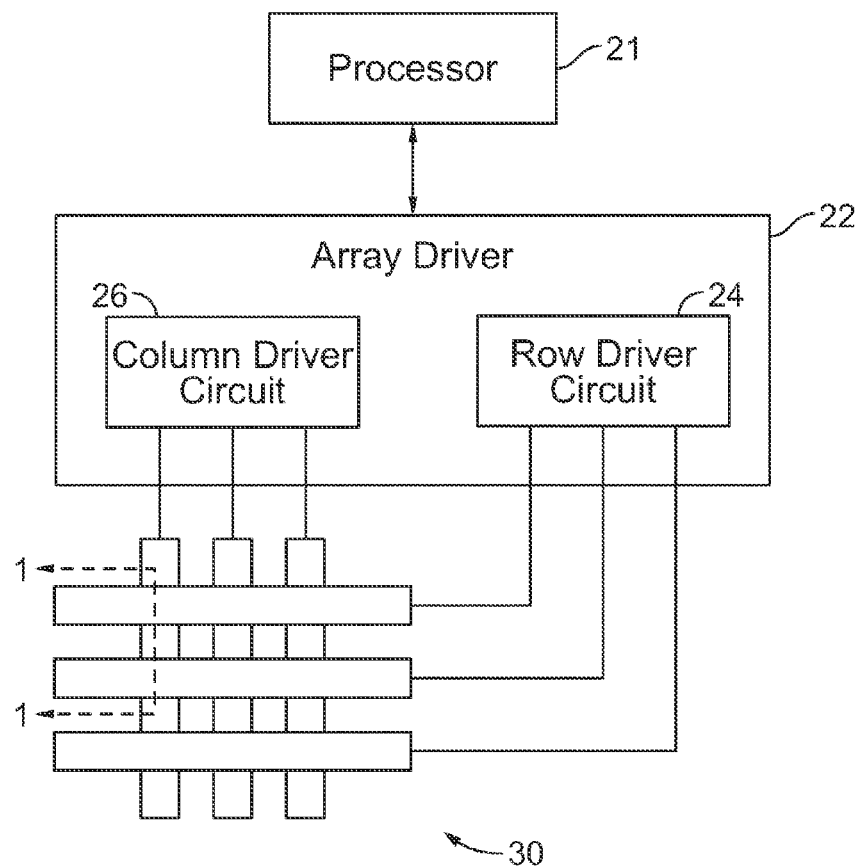
FIG. 2 shows an example of a system block diagram illustrating an electronic device incorporating a 3×3 interferometric modulator display.

FIG. 2 shows an example of a system block diagram illustrating an electronic device incorporating a 3×3 interferometric modulator display. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, e.g., a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3A, 3B:
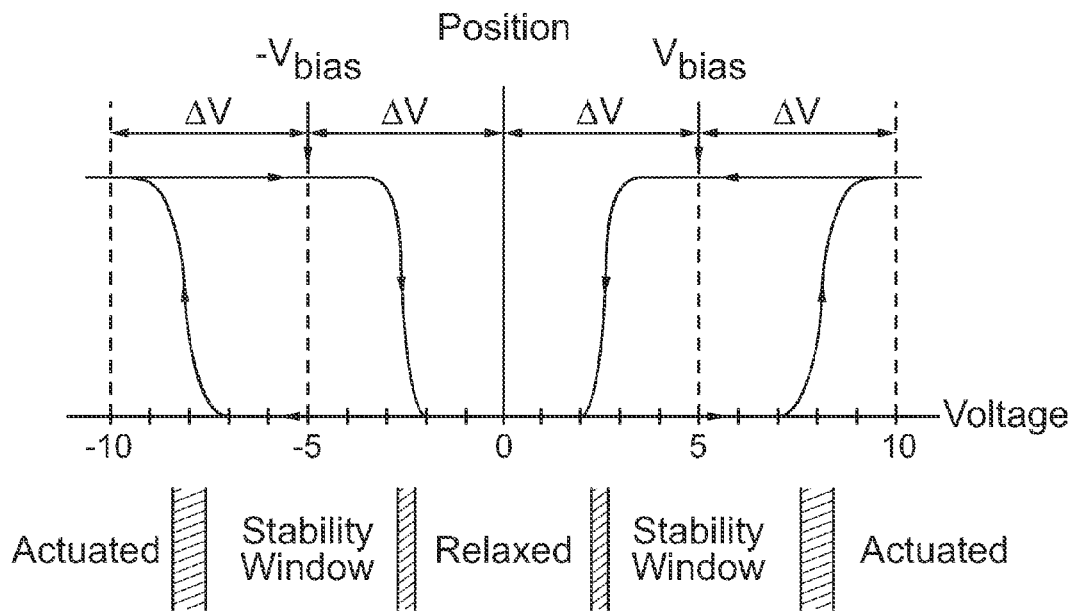
FIG. 3A shows an example of a diagram illustrating movable reflective layer position versus applied voltage for the interferometric modulator of FIG. 1.
FIG. 3B shows an example of a table illustrating various states of an interferometric modulator when various common and segment voltages are applied.

FIG. 3A shows an example of a diagram illustrating movable reflective layer position versus applied voltage for the interferometric modulator of FIG. 1. For MEMS interferometric modulators, the row/column (i.e., common/segment) write procedure may take advantage of a hysteresis property of these devices as illustrated in FIG. 3A. An interferometric modulator may require, for example, about a 10-volt potential difference to cause the movable reflective layer, or mirror, to change from the relaxed state to the actuated state. When the voltage is reduced from that value, the movable reflective layer maintains its state as the voltage drops back below, e.g., 10-volts, however, the movable reflective layer does not relax completely until the voltage drops below 2-volts. Thus, a range of voltage, approximately 3 to 7-volts, as shown in FIG. 3A, exists where there is a window of applied voltage within which the device is stable in either the relaxed or actuated state. This is referred to herein as the "hysteresis window" or "stability window." For a display array 30 having the hysteresis characteristics of FIG. 3A, the row/column write procedure can be designed to address one or more rows at a time, such that during the addressing of a given row, pixels in the addressed row that are to be actuated are exposed to a voltage difference of about 10-volts, and pixels that are to be relaxed are exposed to a voltage difference of near zero volts. After addressing, the pixels are exposed to a steady state or bias voltage difference of approximately 5-volts such that they remain in the previous strobing state. In this example, after being addressed, each pixel sees a potential difference within the "stability window" of about 3-7-volts. This hysteresis property feature enables the pixel design, e.g., illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 3B shows an example of a table illustrating various states of an interferometric modulator when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 3B (as well as in the timing diagram shown in FIG. 4B), when a release voltage $VC_{REL}$ is applied along a common line, all interferometric modulator elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator (alternatively referred to as a pixel voltage) is within the relaxation window (see FIG. 3A, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the interferometric modulator will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which always produce the same polarity potential difference across the modulators. In some other implementations, signals can be used which alternate the polarity of the potential difference of the modulators. Alternation of the polarity across the modulators (that is, alternation of the polarity of write procedures) may reduce or inhibit charge accumulation which could occur after repeated write operations of a single polarity.

Figure 4A:
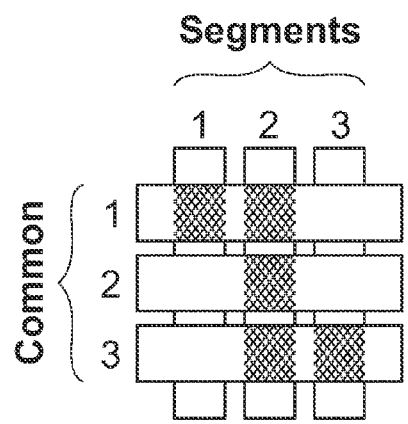
FIG. 4A shows an example of a diagram illustrating a frame of display data in the 3×3 interferometric modulator display of FIG. 2.
Figure 4B:
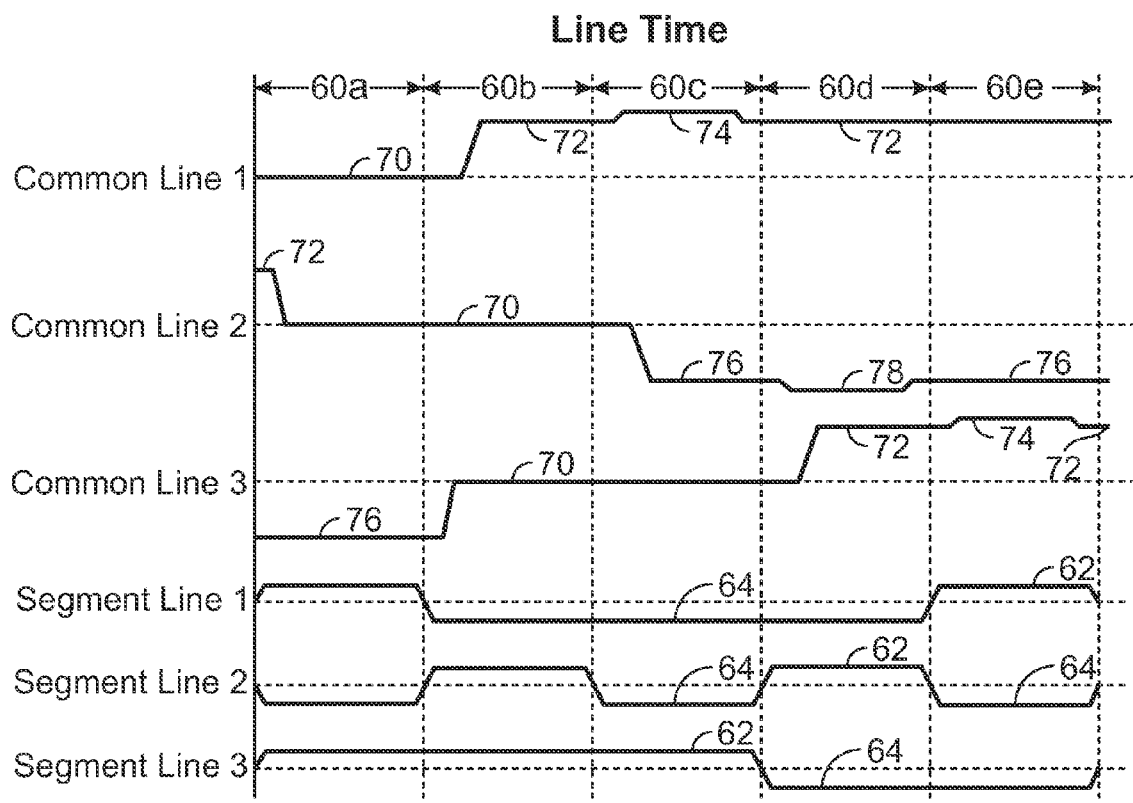
FIG. 4B shows an example of a timing diagram for common and segment signals that may be used to write the frame of display data illustrated in FIG. 4A.

FIG. 4A shows an example of a diagram illustrating a frame of display data in the 3×3 interferometric modulator display of FIG. 2. FIG. 4B shows an example of a timing diagram for common and segment signals that may be used to write the frame of display data illustrated in FIG. 4A. The signals can be applied to the, e.g., 3×3 array of FIG. 2, which will ultimately result in the line time 60e display arrangement illustrated in FIG. 4A. The actuated modulators in FIG. 4A are in a dark-state, i.e., where a substantial portion of the reflected light is outside of the visible spectrum so as to result in a dark appearance to, e.g., a viewer. Prior to writing the frame illustrated in FIG. 4A, the pixels can be in any state, but the write procedure illustrated in the timing diagram of FIG. 4B presumes that each modulator has been released and resides in an unactuated state before the first line time 60a.

During the first line time 60a: a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 3B, the segment voltages applied along segment lines 1, 2 and 3 will have no effect on the state of the interferometric modulators, as none of common lines 1, 2 or 3 are being exposed to voltage levels causing actuation during line time 60a (i.e., $VC_{REL}$—relax and $VC_{HOLD\_L}$—stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position. Thus, at the end of the fifth line time 60e, the 3×3 pixel array is in the state shown in FIG. 4A, and will remain in that state as long as the hold voltages are applied along the common lines, regardless of variations in the segment voltage which may occur when modulators along other common lines (not shown) are being addressed.

In the timing diagram of FIG. 4B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the necessary line time. Specifically, in implementations in which the release time of a modulator is greater than the actuation time, the release voltage may be applied for longer than a single line time, as depicted in FIG. 4B. In some other implementations, voltages applied along common lines or segment lines may vary to account for variations in the actuation and release voltages of different modulators, such as modulators of different colors.

Figure 5A:
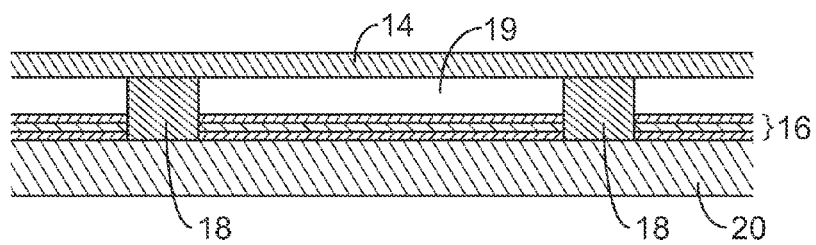
FIG. 5A shows an example of a partial cross-section of the interferometric modulator display of FIG. 1.
Figure 5B:
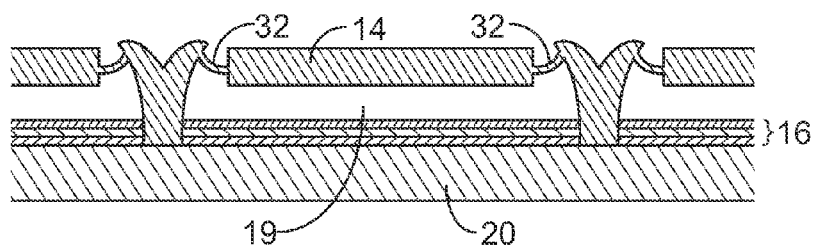
FIGS. 5B-5E show examples of cross-sections of varying implementations of interferometric modulators.
Figure 5C:
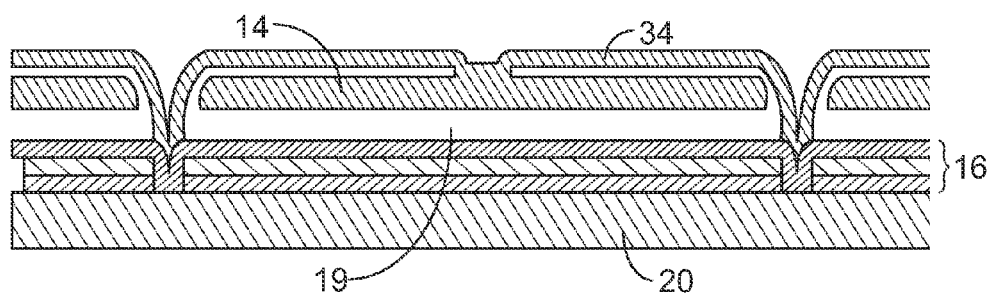

The details of the structure of interferometric modulators that operate in accordance with the principles set forth above may vary widely. For example, FIGS. 5A-5E show examples of cross-sections of varying implementations of interferometric modulators, including the movable reflective layer 14 and its supporting structures. FIG. 5A shows an example of a partial cross-section of the interferometric modulator display of FIG. 1, where a strip of metal material, i.e., the movable reflective layer 14 is deposited on supports 18 extending orthogonally from the substrate 20. In FIG. 5B, the movable reflective layer 14 of each IMOD is generally square or rectangular in shape and attached to supports at or near the corners, on tethers 32. In FIG. 5C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 5C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 5D:
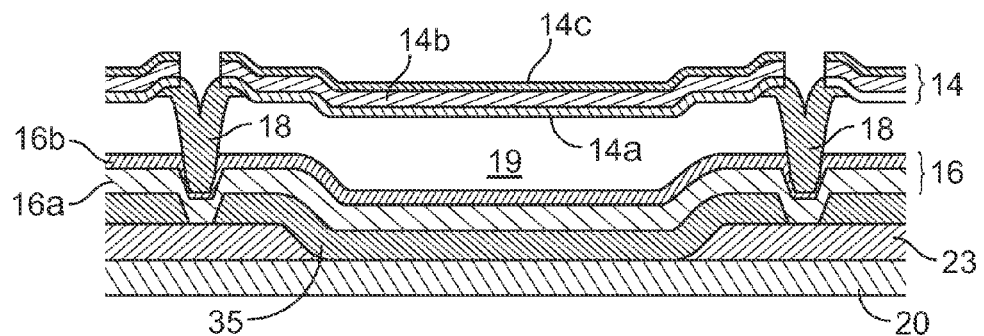

FIG. 5D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, such as, for example, a $SiO_2/SiON/SiO_2$ tri-layer stack. Either or both of the reflective sub-layer 14a and the conductive layer 14c can include, e.g., an Al alloy with about 0.5% Cu, or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 5D, some implementations also can include a black mask structure 23. The black mask structure 23 can be formed in optically inactive regions (e.g., between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, a $SiO_2$ layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, $CF_4$ and/or $O_2$ for the MoCr and $SiO_2$ layers and $Cl_2$ and/or $BCl_3$ for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 5E:
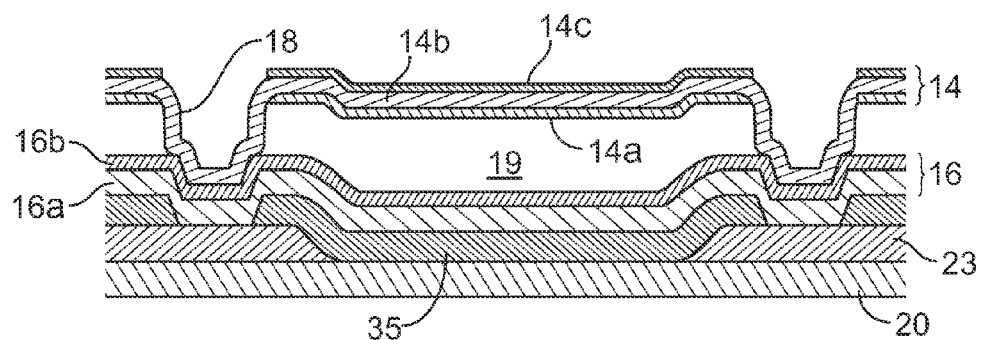

FIG. 5E shows another example of an IMOD, where the movable reflective layer 14 is self supporting. In contrast with FIG. 5D, the implementation of FIG. 5E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 5E when the voltage across the interferometric modulator is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer.

In implementations such as those shown in FIGS. 5A-5E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 5C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 5A-5E can simplify processing, such as, e.g., patterning.

Figure 6:
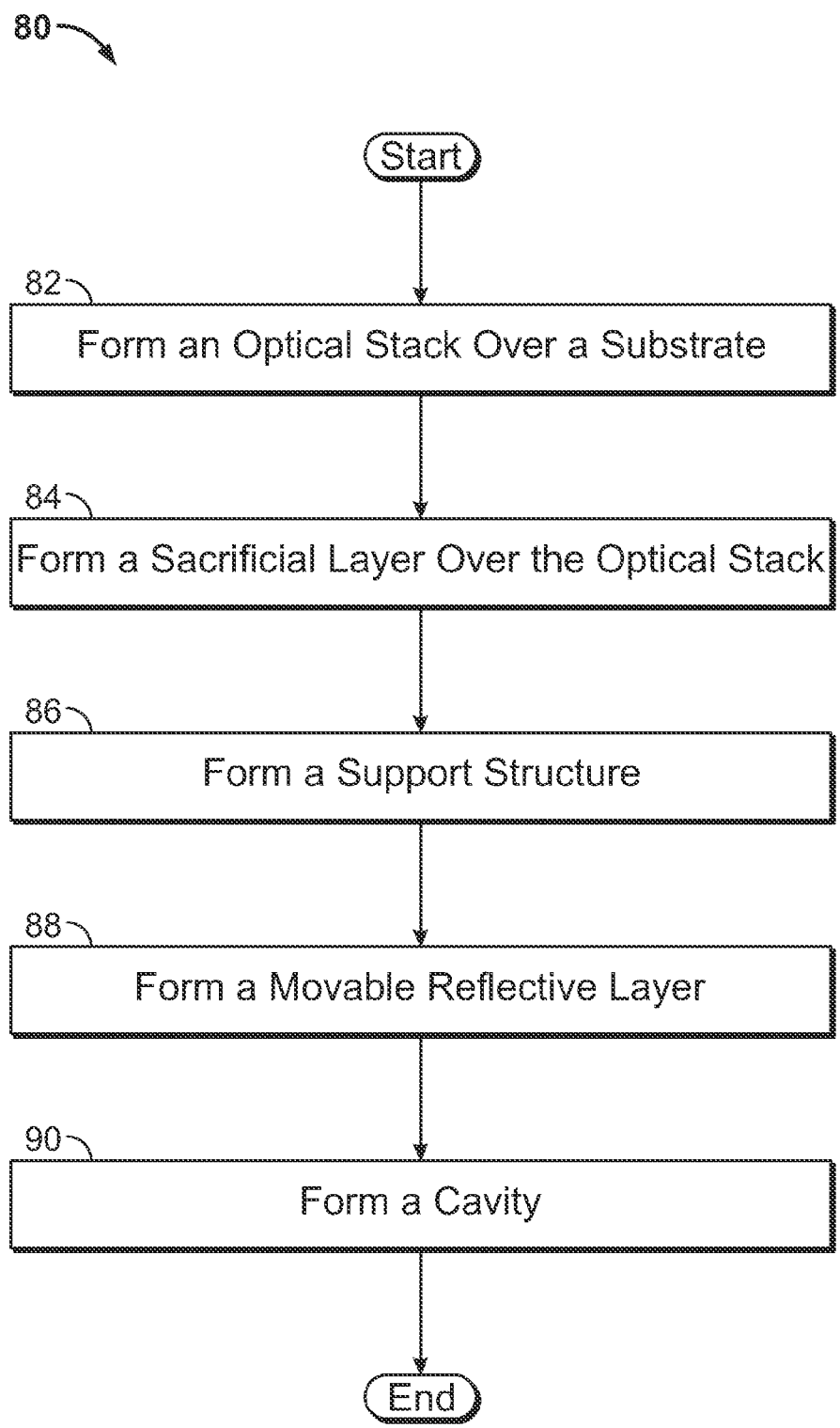
FIG. 6 shows an example of a flow diagram illustrating a manufacturing process for an interferometric modulator.
Figure 7A:
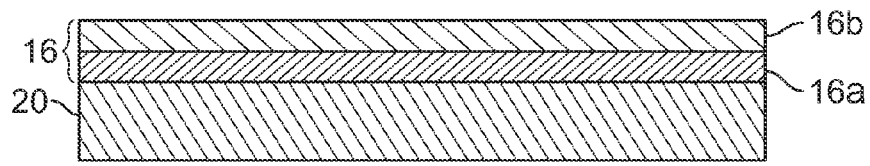
FIGS. 7A-7E show examples of cross-sectional schematic illustrations of various stages in a method of making an interferometric modulator.

FIG. 6 shows an example of a flow diagram illustrating a manufacturing process 80 for an interferometric modulator, and FIGS. 7A-7E show examples of cross-sectional schematic illustrations of corresponding stages of such a manufacturing process 80. In some implementations, the manufacturing process 80 can be implemented to manufacture, e.g., interferometric modulators of the general type illustrated in FIGS. 1 and 5, in addition to other blocks not shown in FIG. 6. With reference to FIGS. 1, 5 and 6, the process 80 begins at block 82 with the formation of the optical stack 16 over the substrate 20. FIG. 7A illustrates such an optical stack 16 formed over the substrate 20. The substrate 20 may be a transparent substrate such as glass or plastic, it may be flexible or relatively stiff and unbending, and may have been subjected to prior preparation processes, e.g., cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 7A, the optical stack 16 includes a multilayer structure having sub-layers 16a and 16b, although more or fewer sub-layers may be included in some other implementations. In some implementations, one of the sub-layers 16a, 16b can be configured with both optically absorptive and conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a, 16b can be an insulating or dielectric layer, such as sub-layer 16b that is deposited over one or more metal layers (e.g., one or more reflective and/or conductive layers). In addition, the optical stack 16 can be patterned into individual and parallel strips that form the rows of the display.

Figure 7B:
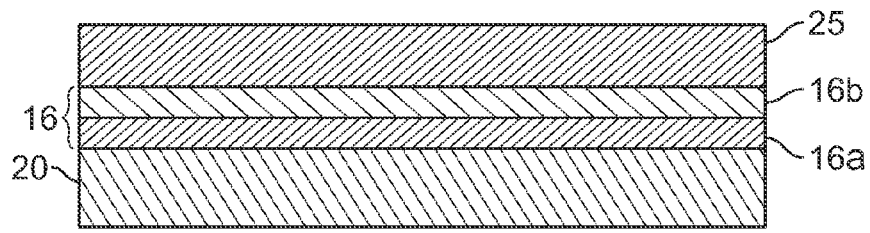

The process 80 continues at block 84 with the formation of a sacrificial layer 25 over the optical stack 16. The sacrificial layer 25 is later removed (e.g., at block 90) to form the cavity 19 and thus the sacrificial layer 25 is not shown in the resulting interferometric modulators 12 illustrated in FIG. 1. FIG. 7B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (Si), in a thickness selected to provide, after subsequent removal, a gap or cavity 19 (see also FIGS. 1 and 7E) having a desired design size. Deposition of the sacrificial material may be carried out using deposition techniques such as physical vapor deposition (PVD, e.g., sputtering), plasma-enhanced chemical vapor deposition (PECVD), thermal chemical vapor deposition (thermal CVD), or spin-coating.

Figure 7C:
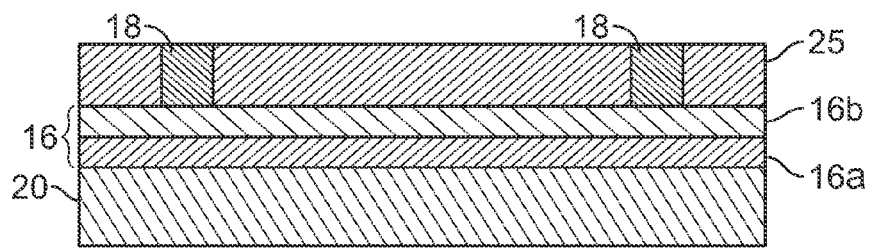

The process 80 continues at block 86 with the formation of a support structure e.g., a post 18 as illustrated in FIGS. 1, 5 and 7C. The formation of the post 18 may include patterning the sacrificial layer 25 to form a support structure aperture, then depositing a material (e.g., a polymer or an inorganic material, e.g., silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 5A. Alternatively, as depicted in FIG. 7C, the aperture formed in the sacrificial layer 25 can extend through the sacrificial layer 25, but not through the optical stack 16. For example, FIG. 7E illustrates the lower ends of the support posts 18 in contact with an upper surface of the optical stack 16. The post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 7C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 7D:
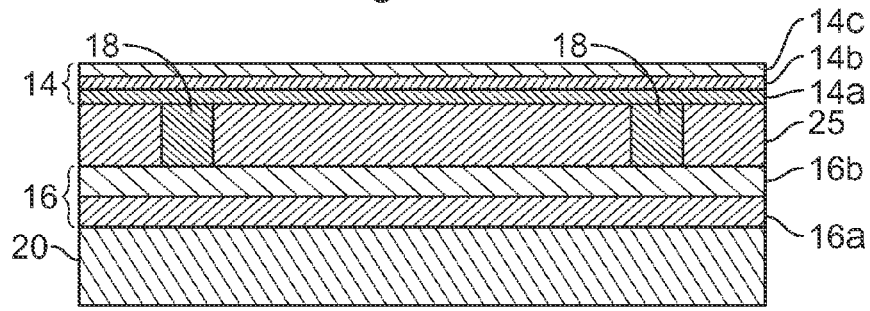
Figure 7E:
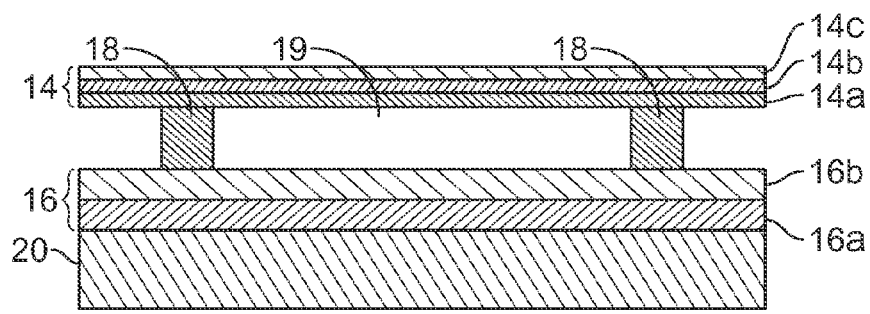

The process 80 continues at block 88 with the formation of a movable reflective layer or membrane such as the movable reflective layer 14 illustrated in FIGS. 1, 5 and 7D. The movable reflective layer 14 may be formed by employing one or more deposition steps, e.g., reflective layer (e.g., aluminum, aluminum alloy) deposition, along with one or more patterning, masking, and/or etching steps. The movable reflective layer 14 can be electrically conductive, and referred to as an electrically conductive layer. In some implementations, the movable reflective layer 14 may include a plurality of sub-layers 14a, 14b, 14c as shown in FIG. 7D. In some implementations, one or more of the sub-layers, such as sub-layers 14a, 14c, may include highly reflective sub-layers selected for their optical properties, and another sub-layer 14b may include a mechanical sub-layer selected for its mechanical properties. Since the sacrificial layer 25 is still present in the partially fabricated interferometric modulator formed at block 88, the movable reflective layer 14 is typically not movable at this stage. A partially fabricated IMOD that contains a sacrificial layer 25 may also be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, e.g., cavity 19 as illustrated in FIGS. 1, 5 and 7E. The cavity 19 may be formed by exposing the sacrificial material 25 (deposited at block 84) to an etchant. For example, an etchable sacrificial material such as Mo or amorphous Si may be removed by dry chemical etching, e.g., by exposing the sacrificial layer 25 to a gaseous or vaporous etchant, such as vapors derived from solid $XeF_2$ for a period of time that is effective to remove the desired amount of material, typically selectively removed relative to the structures surrounding the cavity 19. Other etching methods, e.g. wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

Figure 8A:
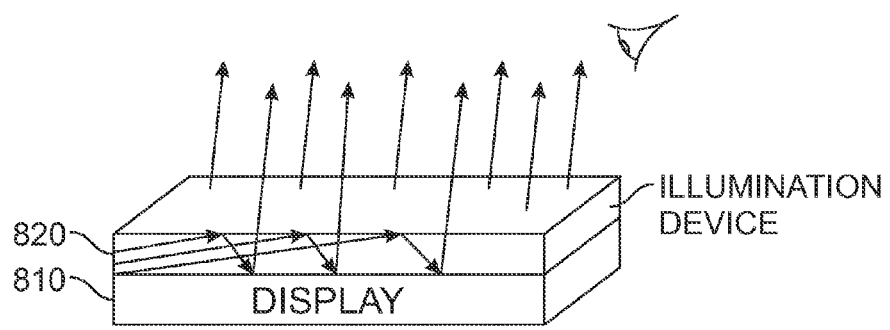
FIG. 8A is an example of an illustration of a display being illuminated by an illumination device.

Reflective displays, such as reflective displays comprising interferometric modulators such as the implementation shown in FIG. 7E, may reflect ambient light towards a viewer thereby providing the viewer with a displayed image. However, in some circumstances, reflective displays such as the display 810 shown in FIG. 8A, may require additional illumination to properly display an image. FIG. 8A is an illustration of a display being illuminated by an illumination device. A reflective display, such as an interferometric modular display or other reflective display, may require an illumination device 820 to illuminate the display 810 in order for the image to be seen by a viewer. This may be desirable when ambient light, even if present, is not sufficient to fully illuminate the display. In some implementations, illumination device 820 may include a front light with turning features to turn light guided within the light guide towards the display 810 allowing the turned light to reflect off of the display 810 towards the viewer. Light may be injected into light guide 820 by one or more LEDs coupled to the illumination device 820 (LED(s) not shown). Alternatively, in some other implementations, an LED may be coupled into an edge bar (not shown) which may then spread the light along the width of light guide 820 to be guided within light guide 820 and then ejected towards the display 810 to illuminate the display 810.

Figure 8B:
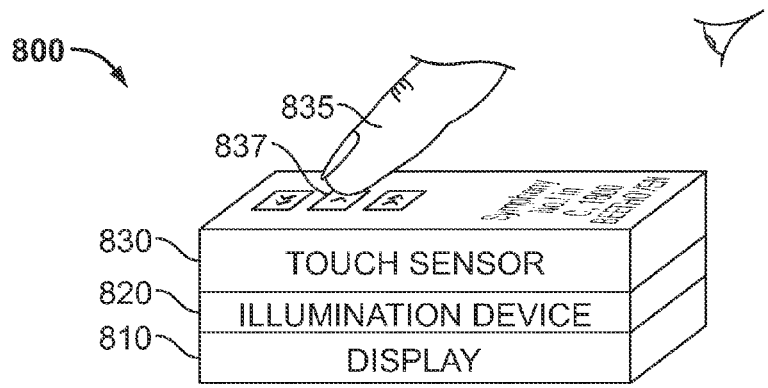
FIG. 8B is an example of an illustration of a display with an illumination device and a touch sensor.

In some implementations, it may be desirable to additionally include touch sensor capability for a display device 800, as shown in the implementation of FIG. 8B. FIG. 8B is an example of an illustration of a display with an illumination device and a touch sensor. As shown in the implementation of FIG. 8B, display 810 is illuminated with illumination device 820. Stacked over the illumination device is touch sensor 830. Touch sensor 830 is capable of determining the location of a touch by sensing a change to the capacitance of a conductor formed in the touch sensor 830, wherein the change to the capacitance of the conductor is induced by the proximity of a human finger 835. The use of touch sensor 830 with illumination device 820 allows for the useful interaction of the user's finger with the display device 800. For example, by touching the screen in different locations, the user may use his or her finger 835 to select a certain icon 837 displayed on the display 810 of the display device 800. In some implementations, illumination device 820 is not integrated with touch sensor 830. Therefore, illumination device 820 and touch sensor 830 are mechanically stacked one on top of the other. As shown in FIG. 8B, touch sensor 830 is stacked over the illumination device 820, however, in other implementations, the illumination device 820 may be stacked over the touch sensor 830. As shown, the touch sensor 830 is closer to the user viewing the display 810. In yet other implementations, the touch sensor 830 may be behind the display 810.

Figure 8C:
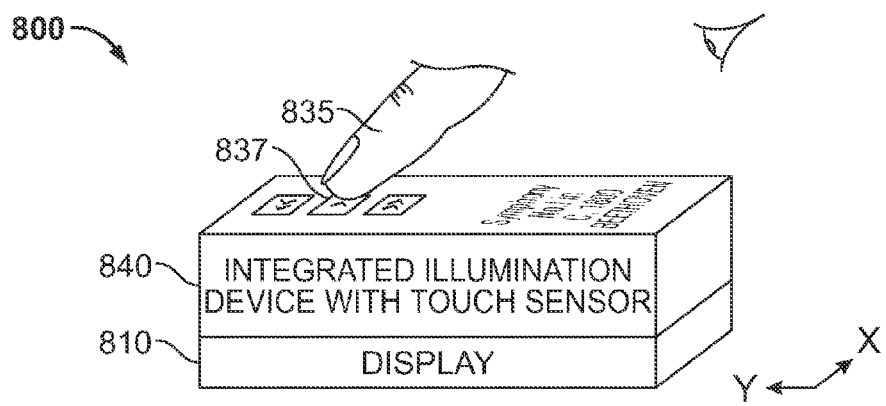
FIG. 8C is an example of an illustration of an implementation of a display with an integrated illumination device with touch sensor.

With reference to FIG. 8C, an example of an illustration of an implementation of a display with an integrated illumination device with touch sensor is shown. FIG. 8C shows an illumination device integrated with touch sensor 840 formed over a display 810, the illumination device integrated with touch sensor 840 being closer to the viewer than display 810 on the side of the display 810 that displays an image, i.e., an image-displaying side. The illumination device integrated with touch sensor 840 can simultaneously illuminate the reflective display 810 to provide for illumination while also allowing for touch sensor capability. In various implementations, one or more components of the illumination device integrated with touch sensor 840 simultaneously have illumination as well as touch-sensing function. For example, conductors formed in the illumination device integrated with touch sensor 840 may provide both illumination capabilities as well as touch-sensing capabilities as will be described in greater detail below. As illustrated, illumination device integrated with touch sensor 840 includes one unit or layer. However, it is understood that the illumination device integrated with touch sensor 840 may include multiple layers and components.

In some implementations, illumination device integrated with touch sensor 840 may be capable of determining whether or not a human finger 835 has touched or come into sufficiently close contact with the illumination device integrated with touch sensor 840 so as to effect the capacitance of conductors at least one of which is formed in the illumination device integrated with touch sensor 840. In various implementations, illumination device integrated with touch sensor 840 is capable of determining a location in x-y coordinates of one or more touches onto the illumination device integrated with touch sensor 840 by a human finger 835. The one or more touches on illumination device integrated with touch sensor 840 by a human finger 835 may be simultaneous or temporally isolated. One way of integrating illumination device 820 and touch sensor 830 of FIG. 8B to form an implementation as illustrated in FIG. 8C is to use metalized turning features in the illumination device 820 while simultaneously using the metalized light-turning features of the illumination device as conductors in electrical communication with an touch-sensing electrode system. The touch-sensing electrode system may be capable of sensing a change to a capacitance of the conductor induced by the proximity of a human finger 835.

Figure 9A:
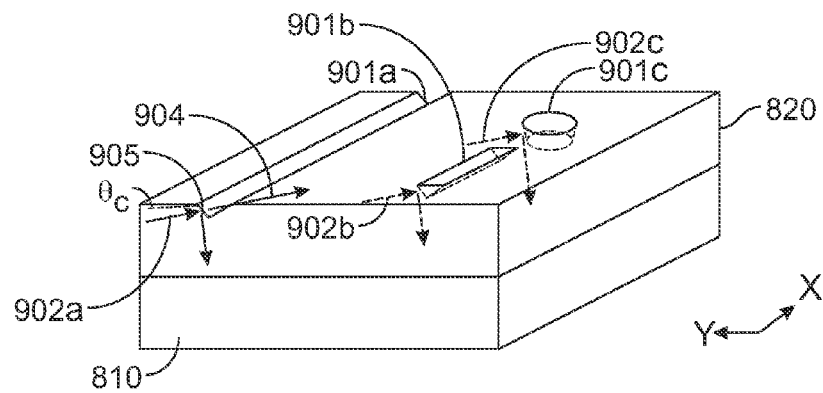
FIG. 9A is an example of an illustration of an implementation of a light guide.

With reference to FIG. 9A, an example of an illustration of an implementation of a light guide is shown. FIG. 9A depicts an implementation of an illumination device 820 comprising light-turning features 901a, 901b, 901c. Such features can "turn" light propagating in light guide 820 out of the light guide and toward a display 810. As shown in FIG. 9A, light-turning features 901a, 901b, 901c include facets 905 that can reflect or turn light. Also as shown in FIG. 9A, light-turning features 901a, 901b, 901c can include multiple different shapes. For example, light-turning features 901a, 901b, 901c may extend longitudinally in one direction, for example, the x direction, as illustrated in feature 901a. In other implementations, the light-turning features 901a, 901b, 901c may include a feature which is discrete, such as 901b and 901c. Also light-turning features 901a, 901b, 901c may include pyramidal, conical or trapezoidal features or other features or cross-sectional profiles capable of ejecting a light ray 902a, 902b, 902c, toward a display 810. Illumination devices similar to illumination device 820 can be useful in illuminating a display 810 from the front and are often referred to as a "front light."

In some implementations, it may be useful to form metal conductors on light-turning features 901a, 901b, 901c. A person/one having ordinary skill in the art will understand that light-turning features may include various types of structures, e.g., diffractive and reflective structures, that redirect light. In some implementations, the light-turning features are reflective, with the reflections occurring on surfaces of the light-turning features. These surfaces are commonly referred to as facets. In some implementations, light-turning feature 901a, 901b, or 901c may be defined by a recess in the light guide 820, with the surfaces of the recess constituting one or more facets 905. Light impinging on the facet 905 may be reflected or may pass through the facet depending upon the angle of incidence of the light. For example, as shown by light ray 902a, a light ray propagating in illumination device 820 may sometimes be incident upon a surface of a facet 905 in a light-turning feature 901a, 901b, 901c at an angle that is less than the critical angle (shown in FIG. 9A as $\theta_c$), as measured relative to the normal to the facet that the light is incident. As will be understood by those of skill in the art, in such cases light ray 902a may exit the illumination device 820 as shown in escaped light ray 904. Such light is wasted since it is not directed towards display 810 and is therefore not used to illuminate display 810. Indeed, such light will degrade the image of the display 810. It is therefore desirable to construct a light-turning feature 901a, 901b, 901c which will reflect light even if light ray 902a is incident upon light-reflecting facet 905 at an angle that is less than the critical angle. Such a light-turning feature may be formed by forming a metal conductor on the surface of facet 905 thereby "metalizing" the surface of facet 905.

Figure 9B:
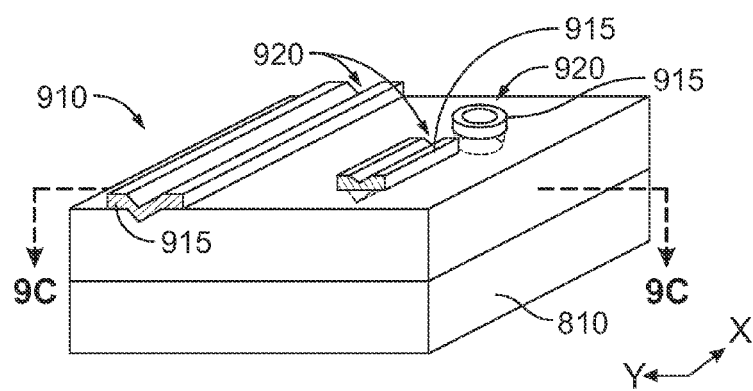
FIG. 9B is an example of an illustration of an implementation of a light guide with metalized light-turning features.

With reference to FIG. 9B, an example of an illustration of an implementation of a light guide with metalized light-turning features is shown. In FIG. 9B, illumination device 910 includes a light guide comprising a conductor 915 formed on a facet of a light-turning feature to form metalized light-turning features 920. Although all of the metalized light-turning features 920 in FIG. 9B are shown fully metalized, it is understood that a metalized light-turning feature 920 need not be completely metalized. For example, a light-turning feature that extends as a long groove (such as, light-turning feature 901a in FIG. 9A) may only be metalized at certain points along the groove (i.e., the x direction), and not along the entirety of the groove. In addition, some light-turning features can be partly and/or completely metalized while others are not metalized. In some implementations, conductor 915 is a reflective or specular metal conductor. As explained above, metalized light-turning features 920 may confer certain advantages over light-turning features that are not metalized. As will be understood by those of skill in the art, the problem discussed above in relation to FIG. 9A of a light ray incident upon a facet of a light-turning feature at an angle below the critical angle is exacerbated when additional layers (with index higher than air) are stacked over a glass or other high index light guide since the low-index layers will increase the critical angle for total internal reflection. This increase in the critical angle will reduce the range of rays ejected by non-metalized light-turning features.

Figure 9C:
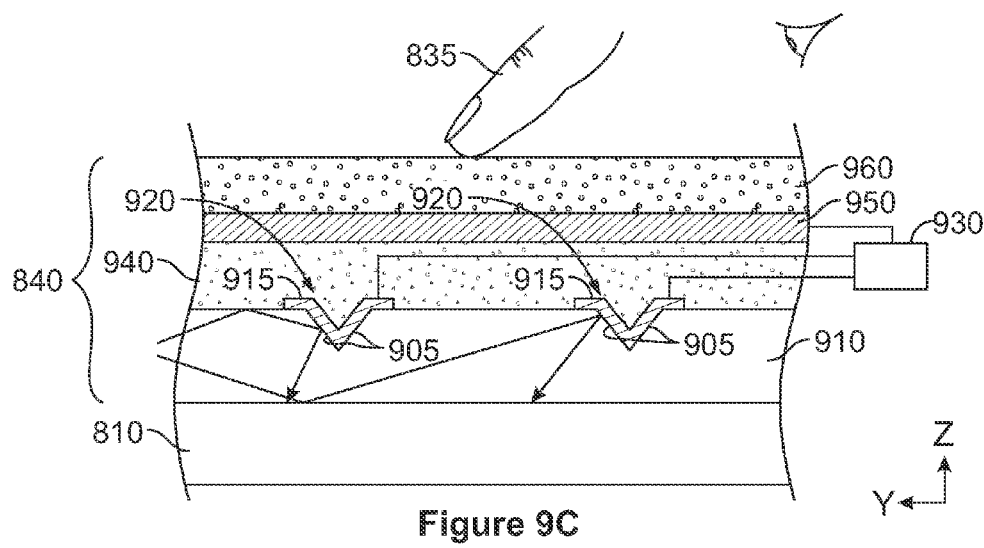
FIG. 9C is an example of a cross-sectional view of an implementation of a light guide with metalized light-turning features with integrated touch sensor.

With reference to FIG. 9C, an example of a cross-sectional view of an implementation of a light guide with metalized light-turning features with integrated touch sensor is shown. FIG. 9C depicts an implementation of an illumination device with conductive features integrated into the metalized light-turning features 920. While shown as having a v-like cross-section, it is understood that metalized light-turning features 920 may have various shapes, such as a tapered cylinder or other shape having facets angled to direct light downwards, as indicated, for example, by reference numerals 901a, 901b, and 901c of FIG. 9A. The illumination device includes a light guide 910 comprising metalized light-turning features 920 having light-reflecting conductors 915 formed on a light-turning feature. The illumination device also includes touch-sensing electronics 930 which are electrically connected to light-reflecting conductors 915 and electrodes 950. In some implementations, the light-reflecting conductors 915 may be part of a light-turning feature 920 over the entire length of the light-turning feature 920, or may only extend part of the length of the light-turning features 920, or may extend farther than the length of light-turning features 920. The touch-sensing electronics 930 may be connected to some of the light-reflecting conductors 915, while other light-reflecting conductors 915 are not electrically connect to the touch-sensing electronics 930. In some other implementations, as illustrated, neighboring light-reflecting conductors 915 may be electrically connected to touch-sensing electronics 930. Additionally, FIG. 9C depicts additional layers formed over the light guide 910. In addition to overcoming problems affiliated with nonmetalized light-turning features as described above, the conductors 915 formed over facets 905 of the light-turning feature 920 may additionally be exploited by being in electrical communication with an electronic system. The conductors 915 may extend partly or completely across a display surface, e.g., completely across the viewable surface of a display. In some implementations, the electronic system includes touch-sensing electronics 930 and the conductors 915 form part of a touch-sensing electrode system. The touch-sensing electrode system may but do not necessarily include a plurality of conductors 915 that are part of metalized light-turning features and a plurality of conductors that are not part of any light-turning feature (which may collectively be referred to as "electrodes") in electrical communication with touch-sensing electronics 930. Touch-sensing electronics 930 may be capable of detecting a change to a capacitance of the conductor 915 induced by the proximity of a conductive body, for example, a human finger 835, and hence the electrode system as a whole is capable of detecting a change to a capacitance of the conductor 915 induced by the proximity of a human finger 835. Using conductors 915 formed on a light-turning feature also as part of a capacitive touch sensor allows for integrating touch-sensor capability with a light guide.

In the implementation illustrated in FIG. 9C, the illumination device integrated with touch sensor capability 840 includes layers over light guide 910, i.e., opposite the light guide 910 from the display 810. For example, layer 940 may be a dielectric layer to electrically isolate conductors 915 from electrode 950 (with electrode 950 extending along the y direction). While only one electrode 950 is shown in the cross-sectional view of FIG. 9C, some implementations may include many electrodes like electrode 950 in parallel extending along the y direction orthogonal to conductors 915. In some implementations, layer 940 may include silicone or other non-corrosive dielectric. Non-corrosive materials are preferred, so as not to degrade or corrupt conductors 915. In some implementations layer 940 may be a pressure sensitive adhesive (PSA) layer that is pressed onto or over light guide 910. Layer 940 may serve other purposes, for example, in implementations without electrodes 950 (see, for example, the implementation of FIG. 10C). Layer 940 may have an index of refraction higher than that of air but lower than about 1.5, or lower than about 1.4, or lower than about 1.35, and therefore, layer 940 formed over light guide 910 may increase the critical angle for light guided in light guide 910. In some implementations, the layer 940 may have an index of refraction of, for example, 1.2 or 1.3. As described above, this may have a negative effect on the turning capability of light-turning features (non-metalized). However, reflective conductors 915 may help reduce these liabilities, and may therefore allow for greater flexibility in designing layers over light guide 910. Additionally, illumination device integrated with touch sensor capability 840 may include other layers, such as passivation layer 960.

Figure 9D:
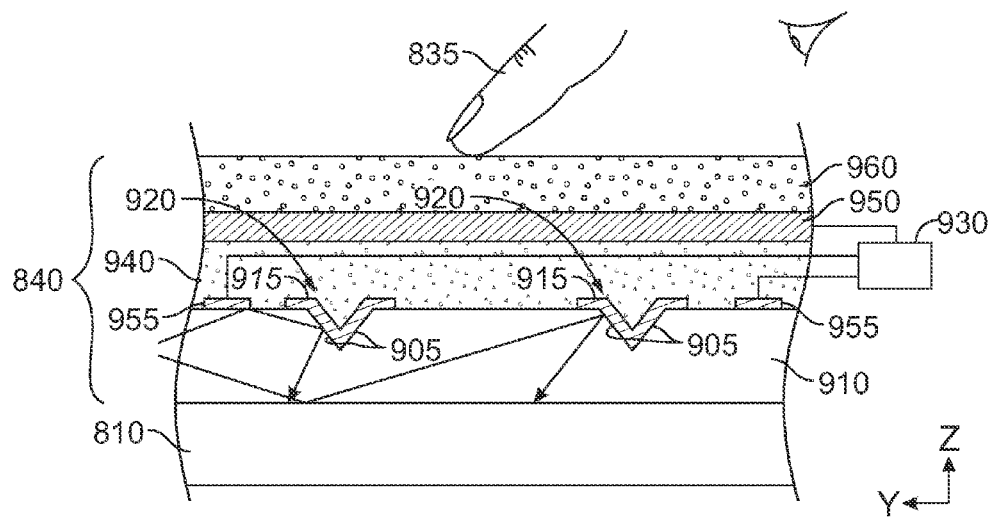
FIG. 9D is an example of an illustration of a cross-sectional view of an implementation with metalized-light-turning features and touch-sensing electrodes.

With reference to FIG. 9D, an example of an illustration of a cross-sectional view of an implementation with metalized-light-turning features and touch-sensing electrodes is shown. The implementation of FIG. 9D is similar to the implementation of FIG. 9C, except that the touch-sensing electronics 930 is not electrically connected to the metalized light-turning features 920. In such an implementation, touch sensing may be accomplished using a grid of electrodes like electrodes 950 (extending in the y direction) and 955 (extending in the x direction, out of the page). It is understood that, alternatively, the touch-sensing electrode may not be a grid, as, for example, in the implementation of FIG. 10C, and hence may only include electrodes 955 (in which case electrodes 955 may include discrete electrodes) without electrodes 950. Such an implementation may be manufactured using relatively few steps, where electrodes 955 and metalized light-turning features 920 are deposited and etched using the same process, as described in greater detail below. In some other implementations, the touch-sensing electronics 930 can be electrically connected to both the metalized light-turning features 920 and the electrodes 955, in addition to being electrically connected to the electrodes 950, or without being electrically connected to the electrodes 950. In some implementations, only some of the metalized light-turning features 920 are connected to the touch-sensing electronics 930.

Figure 10A:
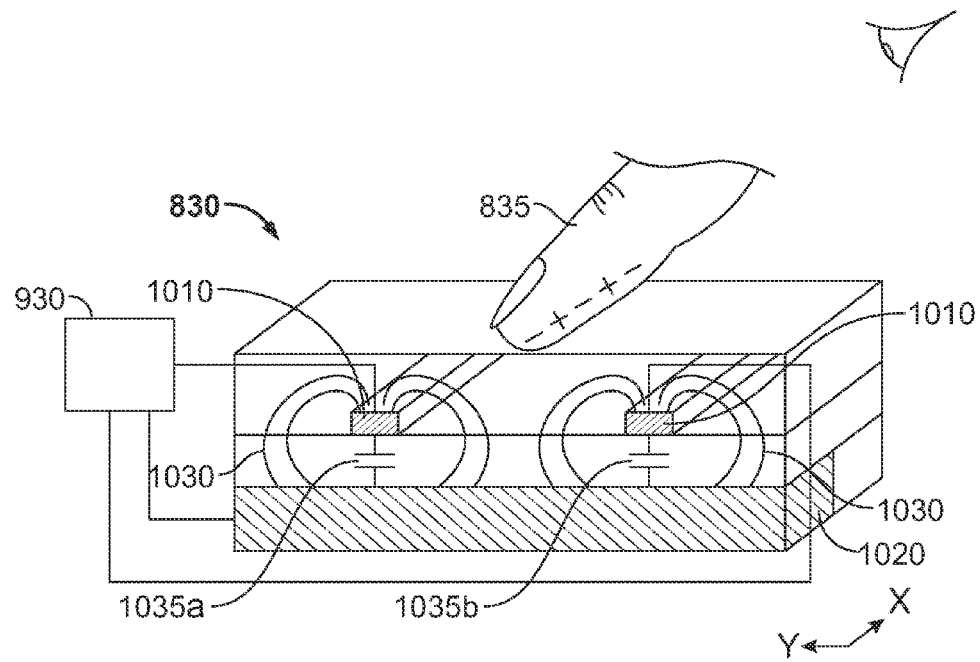
FIG. 10A is an example of an illustration of an implementation of a touch sensor.
Figure 10B:
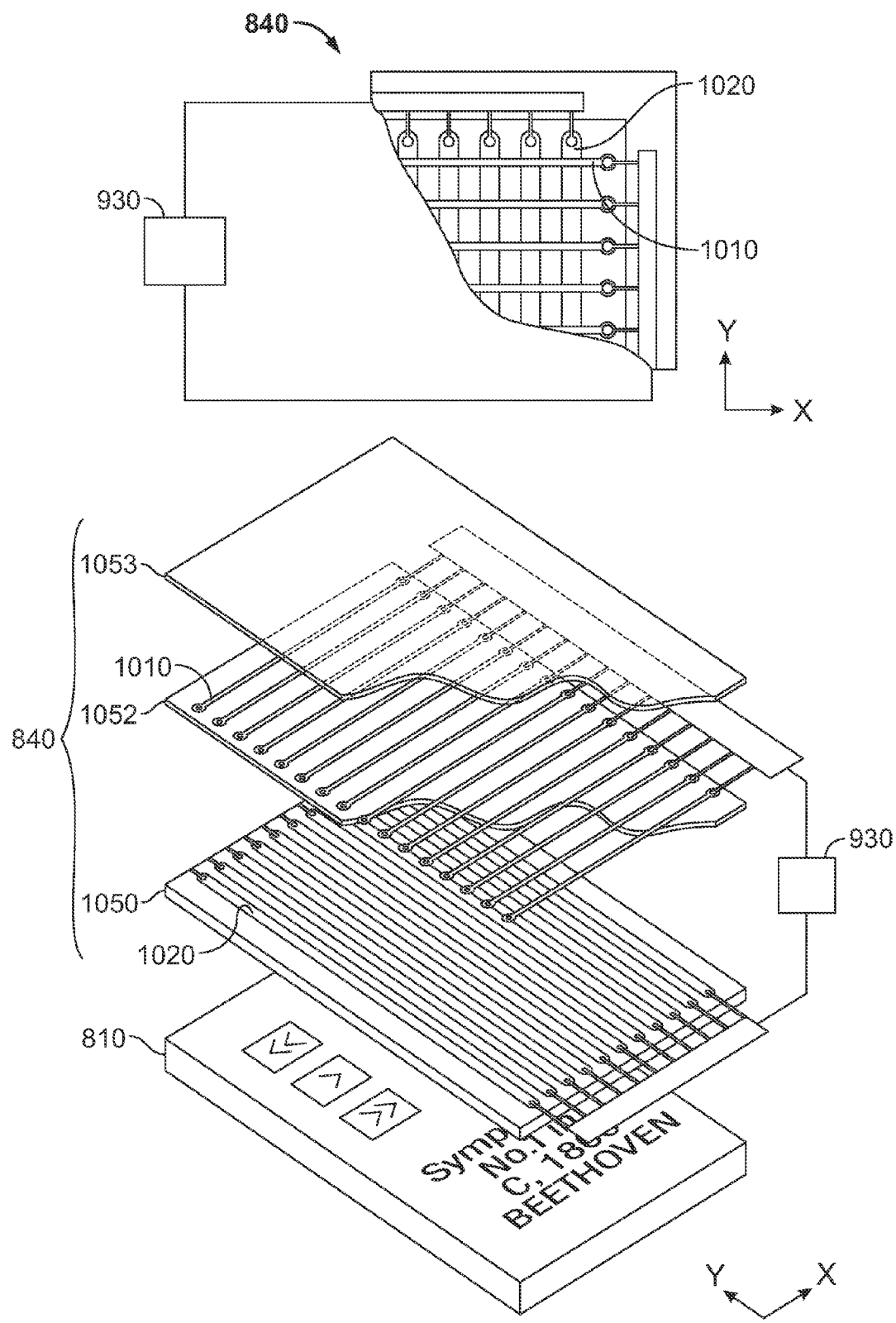
FIGS. 10B-10C are examples of illustrations of implementations of illumination devices with an integrated touch sensor.
Figure 10C:
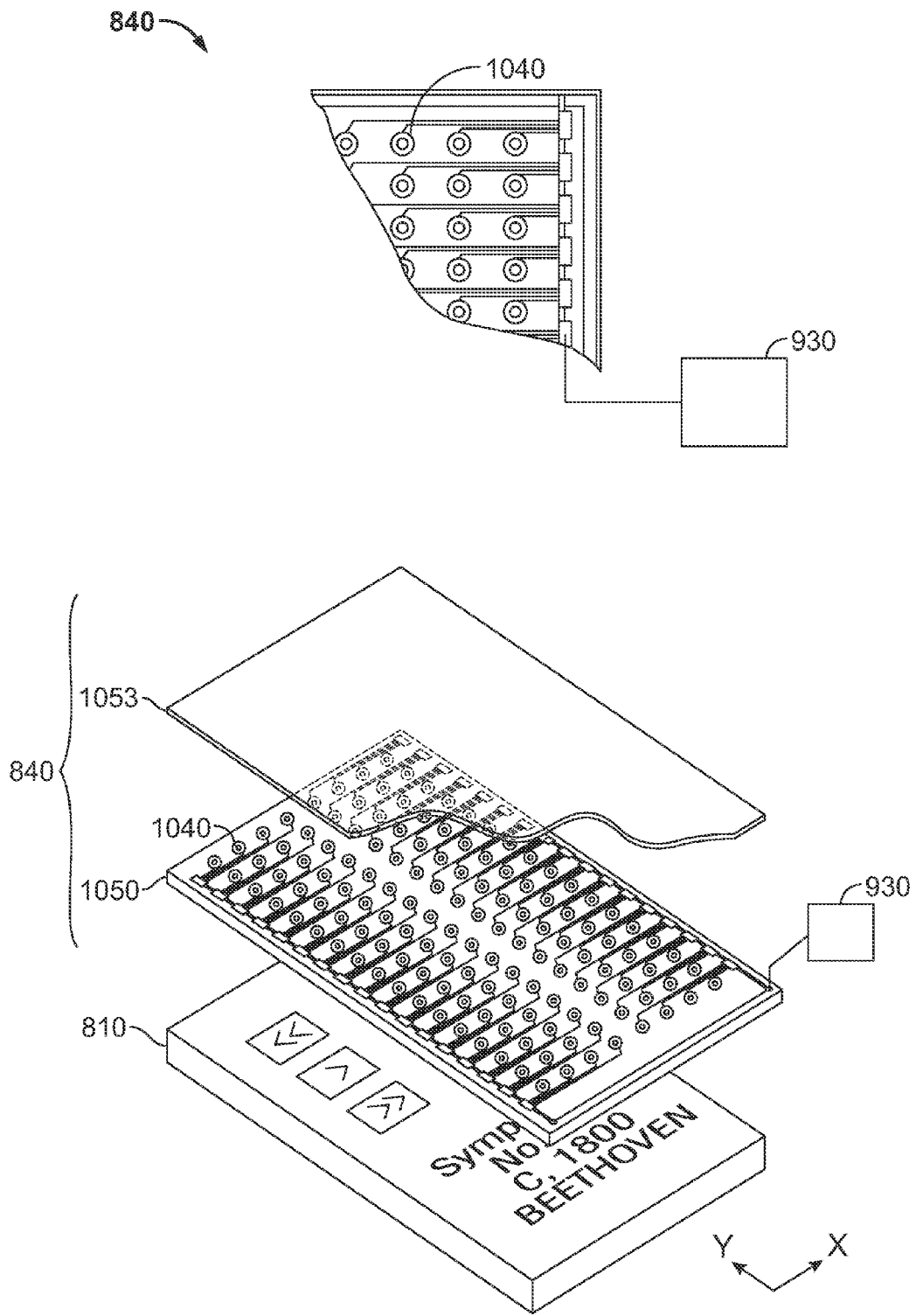

With reference to FIG. 10A, an example of an illustration of an implementation of a touch sensor is shown. The touch sensor may be a capacitive touch sensor. In general, and as depicted in the implementation of FIG. 10A, the capacitive touch sensor includes conductors which serve as electrodes 1010, 1020. As depicted in the implementation of FIG. 10A, electrodes 1010 extend in the x direction, while electrodes 1020 extend in the y direction. If a current is passed in one of electrodes 1010 or electrodes 1020, an electric field, illustrated in FIG. 10A by field lines 1030, may form between electrodes 1010 and electrodes 1020. The electric fields formed between electrodes 1010 and 1020 are related to a mutual capacitance 1035$a$ and 1035$b$. When a human finger 835, or any other conductive body or object, is brought in the proximity of electrodes 1010 or 1020, charges present in the tissues and blood of the finger may change or affect the electric field formed between electrodes 1010 and 1020. This disturbance of the electric field may affect the mutual capacitance and can be measured in a change in the mutual capacitance 1035$a$, 1035$b$, which may be sensed by touch-sensing electronics 930. The conductors 915 of FIG. 9C may simultaneously serve the optical functions described elsewhere herein and may serve as electrodes 1010 or 1020 depicted in FIGS. 10A and 10B or electrodes 1040 in FIG. 10C. FIGS. 10B-10C are examples of illustrations of implementations of illumination devices with an integrated touch sensor.

With reference to FIG. 10B, it is understood that in an illumination device integrated with touch sensor 840, layer 1050 or 1052 may, in some implementations, include a light guide with metalized light-turning features that include some of or a part of electrodes 1020 or 1010. In implementations where layer 1052 is a light guide, electrodes 1020 formed beneath layer 1052, i.e., between layer 1052 and display 810, may be transparent or semi-transparent and include a transparent conductor. Similarly, in some implementations, layer 1053 may include a light guide with metalized light-turning features that include some of or a part of electrodes 1010.

With reference to FIG. 10B, in some implementations, layer 1050 includes a light guide and at least some of or a part of electrodes 1020 include at least some metalized light-turning features formed in layer 1050. Electrodes 1020, including metalized light-turning features, may be formed by a deposition and patterning process. In some implementations, electrodes 1010 formed on layer 1052 may be laminated or bonded onto layer 1050 for convenience and ease of manufacturing.

If the electrodes are in known x-y locations, then the x-y location of a touch by the finger on the touch sensor 830 may also be determined. For example, a touch sensor may include a multitude of electrodes extending in the x direction and a multitude of electrodes extending lengthwise in the y direction and/or periodic in the x direction, as shown in FIG. 10B. The touch-sensing electronics 930 may be capable of isolating or locating or determining x direction electrodes and y direction electrodes that register a change in their mutual capacitances thereby determining the x-y coordinates of the touch. It is understood that a "touch" may include a single touch or multiple touches, whether simultaneous or at different times. "Touch" may also include strokes. It is to be understood that other parts of a human body may be used other than a finger for touching the touch screen. A stylus or any tool capable of affecting the mutual or self capacitance of any electrode system by being in proximity to such system may also be used, such as a conducting body capable of affecting the mutual or self capacitance. Such a tool may be used to touch a display device in order to communicate or input data into a machine using display device simultaneously as an output and as an input device.

In the implementation of FIGS. 10A and 10B, the sensing electronics 930 may sense the mutual capacitance between electrodes 1010 extending in the x direction and electrodes 1020 extending in the y direction. However, in other implementations, only one level of conductors or electrodes may be used, as illustrated in FIG. 10C. In such an implementation, touch-sensing electronics 930 may be in electrical communication with a series of conductors (electrodes 1040 in FIG. 10C) on a touch sensor and may be capable of measuring the self capacitance of the conductors in the touch sensor. The self capacitance is the amount of electrical charge that is added to an isolated conductor to raise its electric potential by one volt. The proximity of a human finger may affect this self capacitance. Touch-sensing electronics 930 may be configured to sense the change in self capacitance. Therefore, in some implementations, a touch sensor may not require a grid of X and Y electrodes but may simply require an array of discrete electrodes 1040 (conductors) dispersed in both the X and y direction at known x-y coordinates. As noted above in relation to FIG. 10B, it is understood that in an illumination device integrated with touch sensor 840, layer 1050 may, in some implementations, include a light guide with metalized light-turning features that include some of or a part of electrodes 1040. Similarly, in some implementations, layer 1053 may include a light guide with metalized light-turning features that include a part of electrodes 1040. In the illustrated implementation, illumination device integrated with touch sensor 840 is disposed in front of display 810 and functions as a front light.

Figure 11A:
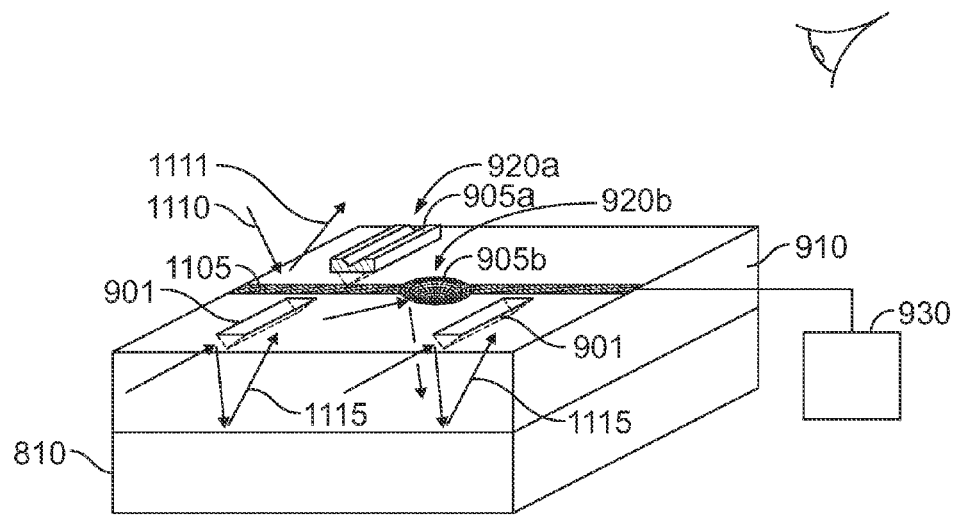
FIG. 11A is an example of an illustration of an implementation of a light guide with metalized light-turning features integrated with a touch sensor.

With reference to FIG. 11A, an example of an illustration of an implementation of a light guide with metalized light-turning features integrated with a touch sensor is shown. FIG. 11A depicts a light guide having light-turning features 901 capable of directing light propagating in the light guide 910 towards a display 810. As shown in FIG. 11A, some light-turning features 901 are left unmetalized while others are metalized light-turning features 920a, 920b. It is noted that while metalized light-turning feature 920b is illustrated as completely metalized in order to maximize the light-turning ability of the feature, it is noted that some implementations may include light-turning features with surfaces or facets that are not completely metalized. As also shown in the implementation of FIG. 11A, an auxiliary structure 1105 can be formed on the same level as the metalized light-turning features 920a, 920b. As shown in FIG. 11A, the auxiliary structure 1105 includes a conductive line. More generally, auxiliary structures can be formed of the same material as the metallization of the metalized light-turning features 920, e.g., by depositing the metallization on the surface of the light guide 910 and then patterning the layer of deposited material to simultaneously define the metallization of the metalized light-turning features 920a, 920b and to form the auxiliary structure 1105. In some implementations, the auxiliary structure 1105 is a conductive line and the metalized light-turning feature 920b is connected to a touch-sensing electrode system (i.e. electrically connected to other electrodes and conductors and to touch-sensing electronics 930) by the conductive line. The conductive line 1105 may include a reflective metal line that connects the conductor of metalized light-turning feature 920b with an electrode system capable of sensing a change to a capacitance of the conductor induced by the proximity of a human finger. In other implementations, conductive line 1105 may include a transparent conductor such as indium tin oxide (ITO). As shown in FIG. 11A, not all metalized light-turning features need be integrated or in electrical communication with the touch-sensing electrode system. For example, in order to achieve a desired illumination of a display 810, light-turning features of a certain size and/or density may be advantageous. For example, for a light-turning feature of about 3-30 um size, in some implementations, about 1,000-100,000 features per square cm of light guide may be used. However, given the dimensions of a human finger, the density of conductors in electrical communication with a touch sensing electrode system may be much less. For example, the spacing between electrodes, including metalized light-turning features that are part of the electrode system, may be roughly greater than one per square centimeter. However, the spacing between electrodes may be less in applications where precision is less important. Similarly, the spacing between electrodes may be greater in other applications where high precision is important. Depending upon the density of metalized light-turning features, in some implementations, one in ten, or less, metalized light-turning features may be in electrical communication with the touch-sensing electrode system. Therefore, in some implementations, the number of metalized light-turning features 920 in electrical communication with the touch-sensing electrode system may be far fewer than the number of metalized light-turning features 920. Furthermore, as shown in FIG. 11A, not all light-turning features need be metalized. Also, as shown in FIG. 11A, some light-turning features 920a are completely metalized, while others (e.g., metalized light-turning feature 920b) are only partially metalized.

In implementations where conductive line 1105 includes a reflective metallic line, reflections of ambient light may occur that may degrade the image formed on display 810. For example, as shown in FIG. 11A, ambient light ray 1110 may be incident on conductive line 1105, and may reflect back towards the viewer. These reflections of ambient light may degrade the image displayed on the display as reflected white light may whiten out the (colored) light that is reflected from the display, illustrated as rays 1115 in FIG. 11A. Similar reflections from metalized light-turning features 920 may similarly degrade an image displayed on display 810. These reflections of ambient light may, as will be understood by those of skill in the art, lead to contrast ratio reduction. Therefore, it is desirable to mask reflections by metallic surfaces, such as metalized light-turning features 920 or metallic conductive lines 1105. One way to accomplish this is to coat metallic surfaces with a thin film interferometric structure in order to reduce or eliminate the reflections that would otherwise lead to contrast ratio reduction.

Figure 11B:
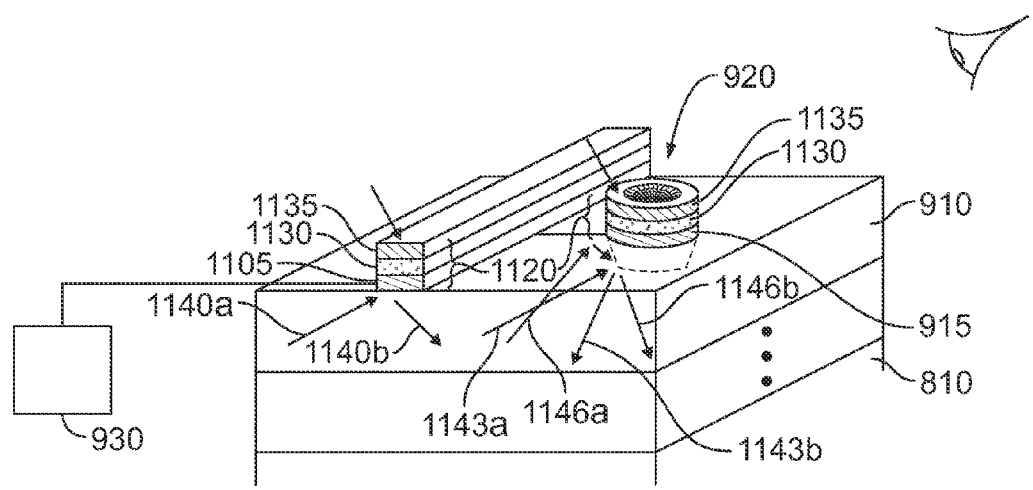
FIG. 11B is an example of an illustration of an implementation of a light guide with layers of material deposited on the surfaces of light-turning features and structures composed of those layers formed outside of the light-turning features.

With reference to FIG. 11B, an example of an illustration of an implementation of a light guide with layers of material deposited on the surfaces of light-turning features and structures composed of those layers formed outside of the light-turning features is shown. FIG. 11B depicts a conductor formed on a light-turning feature to produce a metalized light-turning feature 920, however, additionally, the metalized light-turning feature is masked to reduce or eliminate reflections of ambient light using a thin film interferometric structure 1120. Since the reflective conductor may contribute to the interferometric effect, the thin film interferometric structure 1120 may also be said to include conductor 915 (or conductive line 1105). The thin film interferometric structure 1120 includes a spacer layer 1130, which can be a dielectric or conductive layer in some implementations, and a thin metal or metal alloy absorber 1135. The spacer layer 1130 has a thickness, and may include various suitable transparent materials for forming an "optical resonant cavity." The spacer layer 1130 ("optical resonant cavity") may be formed between the conductor 915 (or conductive line 1105) and the absorber 1135. The spacer layer 1130 may include materials such as air (e.g. using posts to hold up absorber layer 1135), $Al_2O_3$, $SiO_2$, $TiO_2$, ITO, $Si_3N_4$, $Cr_2O_3$, ZnO, or mixtures thereof. Depending on the thickness of the spacer layer 1130, the interferometric structure 1120 may reflect a color such as red, blue, or green, or in other implementations, the thickness of the spacer layer 1130 may be adjusted so as to provide for little or no reflection (e.g., black). A suitable thickness for spacer layer 1030 (other than air) is between 300 Å and 1000 Å to produce an interferometric dark or black effect. Methods of depositing or forming dielectric layers are known in the art, including CVD, as well as other methods. In another implementation, where the spacer layer 1030 is a dielectric or insulator, the spacer layer 1030 may be formed with an air gap or other transparent dielectric material. A suitable thickness for an air gap dielectric layer 1030 is between 450 Å and 1600 Å to produce an interferometric dark or black effect. Other thickness ranges may be used, for example, to achieve other colors such as red, blue, or green.

Also shown in FIG. 11B, formed over the spacer layer 1130 is a metallic absorber 1135. In the illustrated implementation where the interferometric structure 1120 is designed to interferometrically darken the appearance of the naturally reflective conductor 915 formed on the metalized light-turning feature 920 or the conductive line 1105, the absorber 1135 may include, for example, semi-transparent thicknesses of metallic or semiconductor layers. The absorber 1135 may also include materials that have a non-zero n*k, i.e., a non-zero product of the index of refraction (n) and the extinction coefficient (k). In particular, chromium (Cr), molybdenum (Mo), titanium (Ti), silicon (Si), tantalum (Ta), and tungsten (W) all may form suitable layers. Other materials may be employed. In one implementation, the thickness of the absorber 1135 is between 20 Å and 300 Å. In one implementation, the absorber 1135 is less than 500 Å, although thicknesses outside these ranges may be employed. As shown in FIG. 11B, in some implementations, interferometric structure 1120 may also be formed over a conductive line 1105.

While the interferometric structure 1120 formed over conductive line 1105 or metalized light-turning feature 920 allows for little or no reflection of ambient light towards a viewer, for light propagating within light guide 910, the reflective metalized surface of conductors can reflect light that is guided within the light guide as desired. For example, light traveling within the light guide may reflect off of the metallic surface of the conductive line 1105 in such a way so as to continue being guided within the light guide 910, as shown by light rays 1140*a* and 1140*b*. The metal layer 1105 may be about 30-100 nm thick in some implementations. Examples of high reflectivity metals for the metal layer 1105 include Al, Al alloys, Ag, etc. Similarly, light guided within the light guide may reflect off of the metalized light-turning feature 920 so as to be reflected towards a display to be illuminated 810. For example, light ray 1143*a* and 1146*a* are incident upon the reflective conductor comprising metalized light-turning feature 920 and reflected towards the display 810 to be illuminated as shown by rays 1143*b* and 1146*b*. While illustrated in the implementation of FIG. 11B as preventing reflections of ambient light from metalized light-turning features 920 or conductive line 1105, it is understood that interferometric structure 1120 may be formed over any reflective surface formed forward of, i.e. closer to a viewer than or on an image-displaying side of, a display 810. As such, for any reflective surface formed on an illumination device, a capacitive touch sensor, or other device formed forward of a display, an interferometric structure 1120 may be used to reduce reflections of ambient light so as not to degrade the image on the display. Such reflective conductors may be formed on any component configured to be placed on an image-displaying side of a display, for example, a front light formed over a display, a touch sensor formed over a display, or other device formed forward of a display.

As shown in FIG. 11B, auxiliary structure 1105, which may be a conductive line, may be formed on a surface, e.g., the top surface, of the light guide 910, while the conductor 915 is formed in a light-turning feature. As illustrated, the light-turning feature includes a recess formed on the top surface of the light guide 910 and extends down into the light guide 910. The recess can have faceted surfaces for turning light. The conductor 915 formed in the light-turning feature thereby forms a metalized light-turning feature 920. Conductive line 1105 and metalized light-turning feature 920 may be efficiently manufactured by depositing a reflective, conducting material, e.g., a metal, on a top surface (including conformally depositing the material in the recesses of the light-turning features formed on the top surface) of the light guide 910 and etching the material to form the conductive line 1105 and leaving some of the material in the recess of the light-turning feature to form the metalized light-turning feature 920. In other words, an auxiliary structure such as the conductive line 1105 and the metallization in the recesses forming the light-turning features may be formed simultaneously in a single patterning step; it may not be necessary to form conductive line 1105 and metalized light-turning feature 920 in separate steps. This may be accomplished on a light guide comprising a substrate, or a light guide comprising an index-matched turning film formed on an optically transparent substrate.

More generally, the conductive line 1105 illustrated in FIG. 11B may form part of passive and/or active electronic devices. For example, as discussed herein, the line 1105 may be a conductive line 1105 such as an electrode. In other implementations, it is possible to deposit many different kinds of materials other than metals on the top surface of the light guide. For example, the deposited material may include semi-conductor materials, including a highly reflective semi-conducting material, or a dielectric, or a combination of materials having different electrical properties. In such a way, a single deposition of a particular material may be used to form an auxiliary structure (shown in FIG. 11B as a conducting line 1105) on a top surface of a light guide as well as to coat the recess of a light-turning feature formed on the top surface. Similarly, etching the material to form an auxiliary structure and simultaneously leaving some of the material in the recesses of the light-turning features to form material-filled or coated light-turning features may be accomplished using a single patterning process, such as a photolithographic process. Such an auxiliary structure may include a conductive electric trace or other passive electric device. In some implementations, the auxiliary structure may include more than one layer. For example, auxiliary structure may, in some implementations, include layers 1105, 1130, and 1135. As a result, interferometric structure 1120, for example, may be considered an auxiliary structure. Where the auxiliary structure includes more than one layer, not all layers of the auxiliary structure need also be used to coat a light-turning feature. More generally, one or more layers used to coat a light-turning feature may also be used to form the auxiliary structure, but it is understood that the auxiliary structure may include layers not included in the coated light-turning feature, and vice versa. In implementations where the auxiliary structure includes multiple layers, multiple layers of materials may be deposited on the light guide in order to form auxiliary structure and to coat the recess of the light-turning feature, and the deposited layer(s) may then be etched to form the auxiliary structure and coated light-turning feature. In various implementations, after etching the deposited material, additional layers may be deposited on the auxiliary structure that are not then formed in the recesses of the light-turning features, and vice versa. Hence, more generally, the auxiliary structure is at least partially formed of the material coating at least some of the recesses.

As illustrated in the implementation of FIG. 11B, conductive line 1105 is electrically connected to metalized light-turning feature 920. However, it is understood that such an electrical connection is optional. Hence, in some implementations, not all of the metalized light-turning features are part of an electrode system capable of sensing the proximity of a conductive body (touch-sensing electronics 930). This is because the light-turning features may be very dense (i.e., a large number for light-turning features for a given area), while touch-sensing electrodes need not be as dense. For example, touch-sensing electrodes may be horizontally spaced about 1-10 mm, about 3-7 mm, or about 5 mm apart. Indeed, in some implementations (as in FIG. 9D), no metalized light-turning features may be electrically connected to the touch-sensing electronics 930. As described above, a single material deposition may be used to fabricate such a grid of electrodes as well as to conformally coat the recess of a light-turning feature.

As illustrated in FIG. 11B, the display 810 is not always immediately adjacent to the light guide 910. However, it is to be understood that in some implementations display 810 may be immediately adjacent to the light guide 910 which includes the illumination device illuminating display 810. In other implementations, an air gap may be formed between the light guide 910 and the display 810. Further, in other implementations, there may be one or more layers between light guide 910 and display 810. In such implementations, the one or more layers may or may not include an air gap.

Figure 12A:
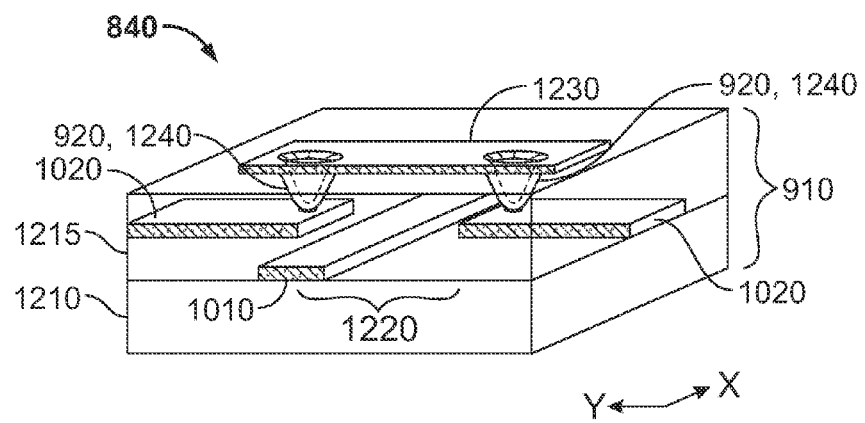
FIGS. 12A-12B are examples of illustrations of implementations of light guides with metalized light-turning features with integrated touch sensor.
Figure 12B:
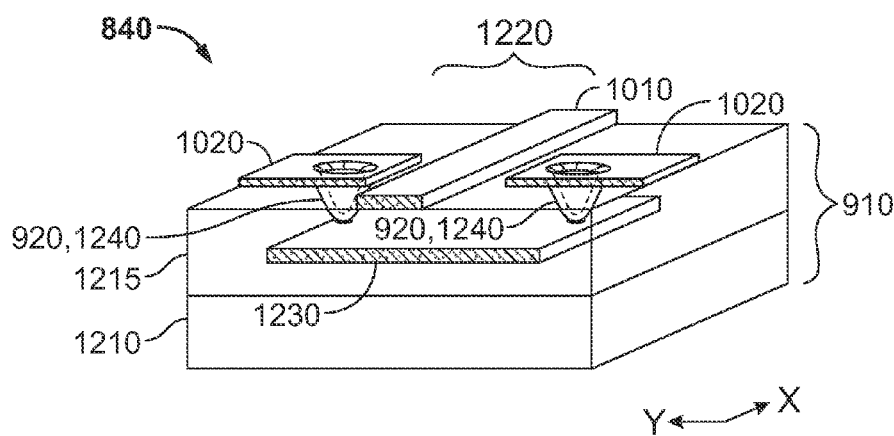

As previously discussed in FIGS. 10A and 10B, some implementations of a touch sensor include a plurality of elongate electrodes elongated along an x direction separated by a dielectric layer and stacked over a plurality of electrodes elongated in a y direction. It may be advantageous in some implementations, however, to form the grid of X and Y electrodes in a single plane or surface. In other words, the grid of X and Y electrodes may be formed on the same surface. In such implementations, the electrodes elongated in one direction, e.g., the x direction, are electrically isolated from the electrodes elongated in the other direction, e.g., the y direction. FIGS. 12A-12B are examples of illustrations of implementations of light guides with metalized light-turning features with integrated touch sensor showing X and Y electrodes formed in a single plane or surface.

For example, in the implementation depicted in FIG. 12A, electrode 1010 extends along the x direction and electrode 1020 extends along the y direction. Electrode 1010 and electrode 1020 may be formed in a single plane. In the illustrated implementation in FIG. 12A, electrodes 1010 and electrodes 1020 are formed on the surface of a glass or other optically transparent substrate 1210. In some implementations, the electrodes 1010, 1020 may be auxiliary structures formed in a manner similar to that of the conductive line 1105, as described above regarding FIG. 11B. Over the optical substrate 1210 is formed a turning layer 1215. The optical substrate 1210 and turning layer 1215 together make up the light guide 910. While, for the purposes of ease of illustration, turning layer 1215 is shown much thicker than substrate 1210, in various implementations the substrate 1210 may be thicker than the relatively thin turning layer 1215. As illustrated in the implementation of FIG. 12A, electrode 1020 is patterned so as to provide for a gap 1220 to allow electrode 1010 to traverse electrode 1020 in a direction perpendicular to the direction of electrode 1020 so as to isolate electrode 1010 and electrode 1020. While FIG. 12A illustrates electrodes 1010 and 1020 as perpendicular from each other, they may be non-parallel but not necessarily perpendicular. The two sides of electrode 1020 are bridged over electrode 1010 through conductive bridge 1230 by forming vias 1240 in the turning layer. The vias 1240 include facets that may be angled appropriately to turn light guided in light guide 910. The vias 1240 are shown formed on both sides of the gap 1220. As illustrated, vias 1240 are conical, but it is understood that they may be formed in any shape that provides for a facet capable of turning light out of light guide 910, such as pyramidal or other profile (like a line or line segment similar to light-turning features 901*a* and 901*b* in FIG. 9A). In one implementation, the vias 1240 may be metalized by conformal deposition of the conductive bridge 1230 in the vias 1240, which expose electrode 1020. However, vias 1240 may be separately filled with conducting material, which may also be reflective. In one implementation, vias 1240 provide a facet that is a 45° angle with respect to a plane parallel to the plane of substrate 1210.

Vias 1240 may also serve as a metalized light-turning feature 920 in the turning layer 1215. Turning layer 1215 may include metalized or non-metalized light-turning features other than vias 1240. As depicted in FIG. 12A, a pair of metalized light-turning features 920 are formed on opposite sides of electrode 1010. Metalized light-turning features 920 act as conductive vias 1240 connecting one side of electrode 1020 with the other side of electrode 1020 along the y direction. Metalized light-turning features 920 may both reflect light towards a display to illuminate a display device while also acting as electrical vias 1240 to bridge electrode 1020. As such, the conductors formed in metalized light-turning features 920 perform both optical functions in an illumination device and electrical functions in a touch sensor to provide for an "integrated" illumination device with touch sensor capability 840. Hence, metalized light-turning features 920 may be in electrical communication with a larger electrode system that is a touch-sensing electrode system capable of sensing a change to a capacitance of the conductor in the metalized light-turning features 920 induced by the proximity of a human finger.

Electrodes 1010 and 1020 as well as bridge 1230 are conductive and may include reflective metallic conductors or transparent conductors, such as ITO. Preferably, electrodes 1010 and 1020 are transparent, while bridge 1230 is reflective. In such an implementation, reflections of ambient light from bridge 1230 may be masked with an interferometric structure similar to that of FIG. 11B. It is understood that the vias 1240, electrodes 1010 and 1020 and bridge 1230 may not be drawn to scale. Electrodes 1010 and 1020 (and to a lesser degree bridge 1230) may be patterned to have a small footprint so as to minimize any effect on light propagating in the light guide 910. Hence, electrodes 1010 and 1020 and bridge 1230 may, in some implementations, have a smaller width than via 1240. The implementation of FIG. 12A may be formed by depositing and patterning electrodes 1010 and 1020. Electrodes 1010 and 1020 and gap 1220 may be formed by patterning a standard pre-coated ITO-coated glass substrate which is commercially and readily available. Gap 1220 may be approximately 50 µm across, but wider or narrower designs may be employed, such as, for example gaps between about 10-1000 µm, or about 20-500 µm. In such implementations, an ITO-coated glass may be patterned to form electrodes 1010 in the x direction and electrodes 1020 in the y direction patterned with gaps 1220 in one or the other direction to prevent the intersection of electrode lines. In such an implementation, the glass substrate can serve as the substrate of a light guide 910. Then turning layer 1215 may be deposited or deposited over substrate 1210. In some implementations, layer 1215 may be a SiON layer that is index matched to substrate 1210. A taper etch process may then be used to define light-turning features and vias 1240 in turning layer 1215. Vias may be approximately 5 µm across. In some implementations, wider or narrower vias may be employed, e.g., the vias may measure about 2-50, or about 3-30 µm across. Then, a reflective conductor layer may be deposited and etched to provide conductor-filled vias 1240, which may also serve as a metalized light-turning feature 920.

With reference to FIG. 12B, another implementation of an electrode system comprising electrodes 1010, 1020 in the X and y direction formed in a single plane is depicted. In some implementations, the electrodes 1010, 1020 may be auxiliary structures formed in a manner similar to that of the conductive line 1105, as described above regarding FIG. 11B. As in the implementation depicted in FIG. 12A, a light guide 910 includes a glass substrate 1210 and a light-turning layer 1215. However, the electrodes 1010 and 1020 and the gap 1220 in the present implementation are formed over the light-turning layer 1215. In this implementation, the bridge 1230 is formed underneath the electrodes 1010 and 1020 and over the substrate 1210. In certain implementations of FIG. 12B, conductive bridge 1230 may be formed of a transparent conductor while electrodes 1010 and 1020 may be formed of reflective metal, and may hence be masked by an interferometric structure as noted above. It is understood that the vias 1240, electrodes 1010 and 1020 and bridge 1230 may not be drawn to scale. In some implementations, bridge 1230 (and to a lesser degree electrodes 1010 and 1020) may be patterned to have a smaller width than the diameter of the vias 1240, so as to reduce the impact of the bridge 1230 on light reflected off the surface of the via 1240. In implementations where bridge 1230 is wider than vias 1240, it may block light that is reflected off vias 1240 from propagating downwards to an underlying display. Vias 1240 may include metalized light-turning features and may be metalized by conformal deposition of electrode 1230 extending into the vias 1240. In some implementations, the vias may have dimensions on the order of microns, while the electrode 1230 (as well as the conformal coating of the via 1240) may have a thickness on the order of one tenth of a micron. Conductive material may be deposited onto substrate 1210 and patterned to form conductive bridge 1230. In some implementations conductive material may include a transparent conductor. Conductive bridge 1230 may be also formed by patterning a standard pre-coated ITO-coated glass substrate which is commercially and readily available. Turning layer 1215, light-turning features in turning layer 1215, and vias 1240 may all then be formed, for example, as described above regarding FIG. 12A. In some implementations, the dimensions for gap 1220 and vias 1240 in the implementation of FIG. 12B may be similar to those noted above regarding FIG. 12A. In certain implementations, the conductive bridge 1230 of the implementation of FIG. 12A and the electrodes 1010 and 1020 of the implementation of FIG. 12B may be laminated. In one example of such a method, bridge 1230 or electrodes 1010, 1020 may be formed on the bottom of a lamination layer (not shown in FIGS. 12A and 12B), and the layer may then be laminated over turning layer 1215 to connect bridge 1230 or electrodes 1010, 1020 with conducting vias 1240.

Figure 13A:
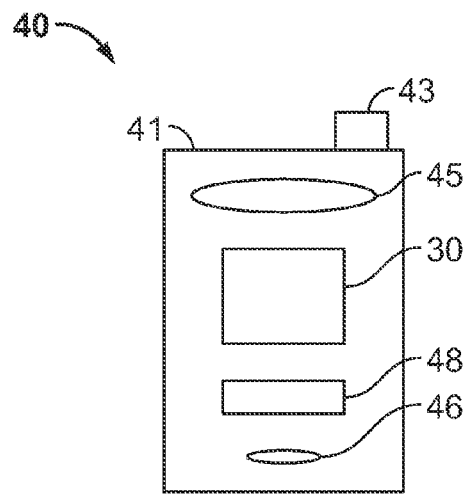
FIGS. 13A and 13B show examples of system block diagrams illustrating a display device that includes a plurality of interferometric modulators.
Figure 13B:
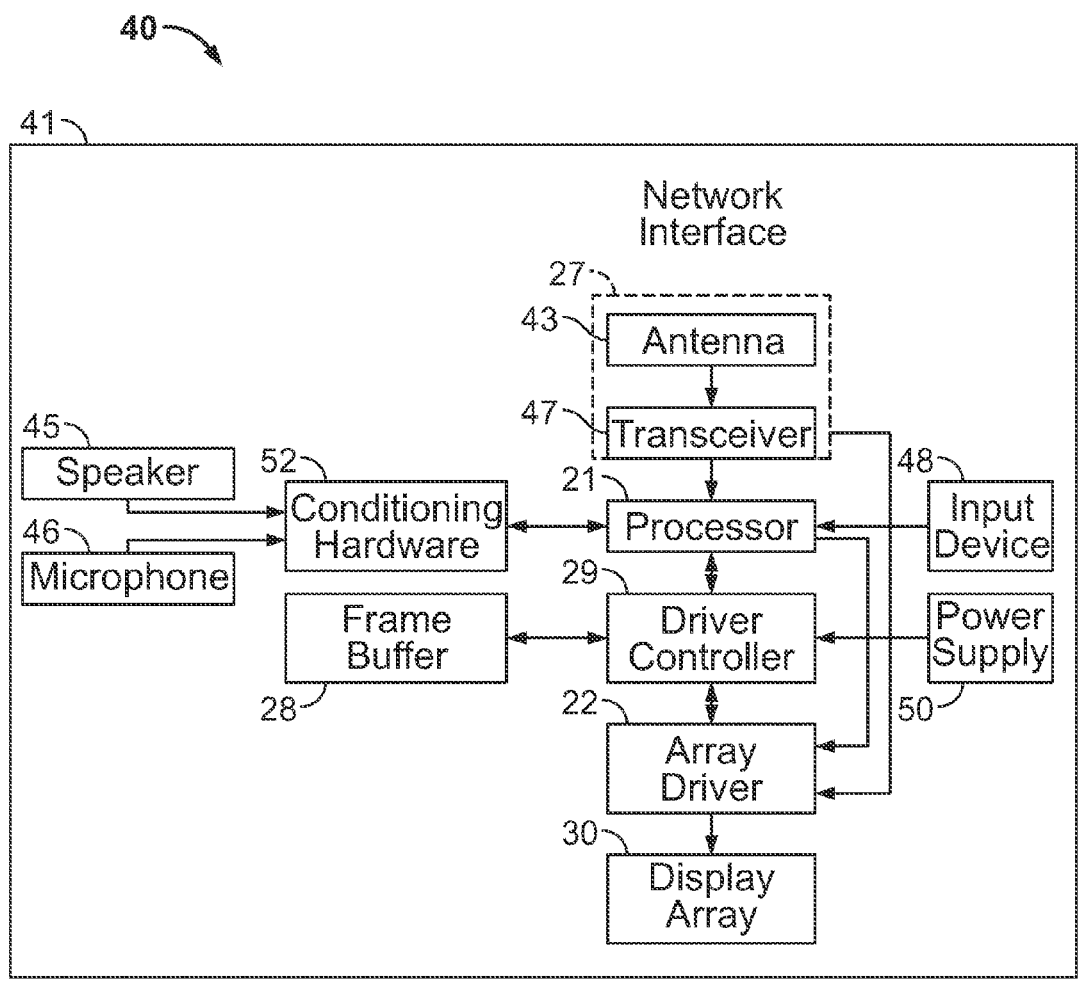

FIGS. 13A and 13B show examples of system block diagrams illustrating a display device 40 that includes a plurality of interferometric modulators. The display device 40 can be, for example, a cellular or mobile telephone. However, the same components of the display device 40 or slight variations thereof are also illustrative of various types of display devices such as televisions, e-readers and portable media players.

The display device 40 includes a housing 41, a display 30, an antenna 43, a speaker 45, an input device 48, and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber, and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein.

The components of the display device 40 are schematically illustrated in FIG. 13B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 can provide power to all components as required by the particular display device 40 design.

The network interface 27 includes the antenna 43 and the transceiver 47 so that the display device 40 can communicate with one or more devices over a network. The network interface 27 also may have some processing capabilities to relieve, e.g., data processing requirements of the processor 21. The antenna 43 can transmit and receive signals. In some implementations, the antenna 43 transmits and receives RF signals according to the IEEE 16.11 standard, including IEEE 16.11 (a), (b), or (g), or the IEEE 802.11 standard, including IEEE 802.11a, b, g or n. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), NEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (e.g., an IMOD controller). Additionally, the array driver 22 can be a conventional driver or a bi-stable display driver (e.g., an IMOD display driver). Moreover, the display array 30 can be a conventional display array or a bi-stable display array (e.g., a display including an array of IMODs). In some implementations, the driver controller 29 can be integrated with the array driver 22. Such an implementation is common in highly integrated systems such as cellular phones, watches and other small-area displays.

In some implementations, the input device 48 can be configured to allow, e.g., a user to control the operation of the display device 40. The input device 48 can include a keypad, such as a QWERTY keyboard or a telephone keypad, a button, a switch, a rocker, a touch-sensitive screen, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices as are well known in the art. For example, the power supply 50 can be a rechargeable battery, such as a nickel-cadmium battery or a lithium-ion battery. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An illumination device with integrated touch-sensing capability comprising:
    a light guide having a conductor formed on a light-turning feature, and extending into a recess of the light turning feature; and
    a touch-sensing electrode system capable of sensing a change to an electric field of the conductor,
    wherein the touch-sensing electrode s stem includes a first electrode extending in one direction and a second electrode extending in another, non-parallel direction,
    wherein the first electrode has a gap with two sides formed to prevent the intersection of the first and the second electrodes, the gap breaking the first electrode into a first side and a second side, and
    wherein the first and second electrodes are formed on a single surface.

2. The illumination device of claim 1, wherein the conductor is formed on a faceted feature on a surface of the light guide.

3. The illumination device of claim 1, wherein the conductor is masked in order to reduce reflections of ambient light from the conductor.

4. The illumination device of claim 3, wherein the conductor is masked with an interferometric structure.

5. The illumination device of claim 4, wherein the interferometric structure is configured to be more reflective of light striking a bottom surface of the interferometric structure than light striking a top surface of the interferometric structure.

6. The illumination device of claim 1, wherein the electrode system is capable of determining a location in an x-y plane of the change to the electric field of the conductor.

7. The illumination device of claim 1, further comprising:
    a display which can be illuminated by the light guide;
    a processor that is configured to communicate with the display, the processor being configured to process image data; and
    a memory device that is configured to communicate with the processor.

8. The illumination device of claim 7, further comprising a driver circuit configured to send at least one signal to the display.

9. The illumination device of claim 8, further comprising a controller configured to send at least a portion of the image data to the driver circuit.

10. The illumination device of claim 7, further comprising an image source module configured to send the image data to the processor.

11. The illumination device of claim 10, wherein the image source module includes at least one of a receiver, transceiver, or transmitter.

12. The illumination device of claim 7, further comprising:
    an input device configured to receive input data and to communicate the input data to the processor.

13. The illumination device of claim 1, wherein
    the light guide includes a light-turning layer formed on a substrate; and
    the light-turning feature is formed in the light-turning layer.

14. The illumination device of claim 1, wherein the first side of the first electrode is electrically connected to the second side of the first electrode across the gap through a conductive bridge and vias formed on both sides of the gap.

15. The illumination device of claim 14, wherein the first and second electrodes include transparent conductors.

16. The illumination device of claim 14, wherein the conductive bridge is formed on a level below the surface of the first and second electrodes.

17. The illumination device of claim 14, wherein the conductive bridge includes a reflective conductor.

18. The illumination device of claim 14, wherein the vias include a reflective conductor.

19. The illumination device of claim 18, wherein the vias are light-turning features configured to direct light downward out of the light guide.

20. The illumination device of claim 1, wherein the first and second electrodes are formed in two different layers.

21. The illumination device of claim 1, wherein the touch-sensing electrode system is capable of sensing a change to a mutual capacitance.

22. The illumination device of claim 1, wherein the touch-sensing electrode system is capable of sensing a change to a self capacitance.

23. The illumination device of claim 1, wherein the light guide has light-turning features that are not in electrical communication with the touch-sensing electrode system.

24. The illumination device of claim 1, wherein the light guide is disposed over a reflective display.

25. The illumination device of claim 24, wherein the reflective display includes display elements including interferometric modulators.

26. The illumination device of claim 1, wherein the change to the electric field is induced by the proximity of a body.

27. The illumination device of claim 26, wherein the body is electrically conductive.

28. A method of manufacturing an illumination device with integrated touch-sensing capability comprising:
    patterning a first electrode extending in one direction and a second electrode extending in another, non-parallel direction on a substrate;

patterning a gap with two sides in the first electrode formed to prevent the intersection of the first and second electrodes, the gap breaking the first electrode into a first side and a second side;
depositing an index-matched turning layer on the substrate to form a light guide;
taper etching a light-turning feature in the turning layer to form a facet;
depositing a reflective conductor on surfaces of the facet, and extending into a recess of the facet;
etching the light-turning feature for electrically connecting to one of the first and second sides of the first electrode; and
electrically connecting the conductor to an electrode system capable of sensing a change to an electric field of the conductor, the electrode system including the first and second electrodes.

29. The method of manufacturing the illumination device with integrated touch-sensing capability of Claim 28, further comprising
depositing a conductive bridge in a layer over the turning layer, thereby electrically bridging the first side and the second side of the first electrode through the conductor formed on the light-turning feature and the conductive bridge.

30. The method of claim 28, wherein the change to the electric field is induced by the proximity of a body.

31. The method of claim 30, wherein the body is electrically conductive.

32. The method of claim 28, wherein sensing the change to the electric field includes sensing a change to a capacitance of the conductor.

33. A method of manufacturing the an illumination device with integrated touch-sensing capability comprising:
depositing an index-matched turning layer on a substrate;
taper etching the light-turning feature in the turning layer to form a facet;
depositing a reflective conductor on surfaces of the facet, and extending into a recess of the facet;
patterning a first electrode extending in one direction and a second electrode extending in another, non-parallel direction on the turning layer;
patterning a gap with two sides in the first electrode formed to prevent the intersection of the first and the second electrodes, the gap breaking the first electrode into a first side and a second side;
etching the light-turning feature for electrically connecting to one of the first and second sides of the first electrode; and
electrically connecting the conductor to an electrode system capable of sensing a change to an electric field of the conductor, the electrode system including the first and second electrodes.

34. The method of manufacturing the illumination device with integrated touch-sensing capability of claim 33, further comprising
depositing a conductive bridge in a layer below the turning layer thereby electrically bridging the first side and the second side of the first electrode through the conductor formed on the light-turning feature and the conductive bridge.

35. An illumination device comprising:
a light guide having a conductor, formed on a light-turning facet, and extending into a recess of a light turning feature,
a first electrode extending in one direction and a second electrode extending in another, non-parallel direction,
wherein the first electrode has a gap with two sides formed to prevent the intersection of the first and second electrodes, the gap breaking the first electrode into a first side and a second side,
wherein the first and second electrodes are formed on a single surface, and
wherein the conductor formed on the light-turning facet is electrically connected to an electronic system.

36. The illumination device of claim 35, wherein the electronic system is capable of detecting the proximity of an electrically conductive body.

37. The illumination device of claim 36, wherein the conductor forms electrodes in a capacitive touch sensor system.

38. The illumination device of claim 35, wherein the conductor constitutes a layer in a stack of materials forming an interferometric structure for reducing reflections.

39. The illumination device of claim 35, wherein the conductor extends across an entire display surface.

* * * * *